United States Patent
Zhang

(10) Patent No.: US 12,539,301 B2
(45) Date of Patent: Feb. 3, 2026

(54) COMPOUND EXTERNAL PREPARATION FOR TREATING ALOPECIA AREATA AND PREPARATION METHOD THEREFOR

(71) Applicant: CHANGSHA JINGYI PHARMACEUTICAL TECHNOLOGY CO., LTD, Hunan (CN)

(72) Inventor: Hailong Zhang, Hunan (CN)

(73) Assignee: King-eagle Med Technology Co., Ltd., Changsha (CN)

( * ) Notice: Subject to any disclaimer, the term of this patent is extended or adjusted under 35 U.S.C. 154(b) by 350 days.

(21) Appl. No.: 18/036,395

(22) PCT Filed: Nov. 11, 2021

(86) PCT No.: PCT/CN2021/129965
§ 371 (c)(1),
(2) Date: May 10, 2023

(87) PCT Pub. No.: WO2022/100642
PCT Pub. Date: May 19, 2022

(65) Prior Publication Data
US 2024/0009192 A1    Jan. 11, 2024

(30) Foreign Application Priority Data
Nov. 11, 2020    (CN) .......................... 202011256258.X

(51) Int. Cl.
| A61K 31/506 | (2006.01) |
| A61K 9/06 | (2006.01) |
| A61K 9/12 | (2006.01) |
| A61K 31/519 | (2006.01) |
| A61K 47/10 | (2017.01) |
| A61K 47/20 | (2006.01) |
| A61P 17/14 | (2006.01) |

(52) U.S. Cl.
CPC .............. *A61K 31/506* (2013.01); *A61K 9/06* (2013.01); *A61K 9/122* (2013.01); *A61K 31/519* (2013.01); *A61K 47/10* (2013.01); *A61K 47/20* (2013.01); *A61P 17/14* (2018.01)

(58) Field of Classification Search
CPC ........ A61K 31/506; A61K 9/06; A61K 9/122; A61K 31/519; A61K 47/10; A61K 47/20; A61K 9/124; A61K 9/0014; A61K 9/107; A61K 45/06; A61K 47/26; A61P 17/14
See application file for complete search history.

(56) References Cited

U.S. PATENT DOCUMENTS

2019/0231782 A1*    8/2019    Chen ....................... A61K 9/06

FOREIGN PATENT DOCUMENTS

| CN | 105434352 A | * | 3/2016 | ........... A61K 31/506 |
| CN | 106138058 A | | 11/2016 | |
| WO | 2008110872 A2 | | 9/2008 | |
| WO | WO-2019236596 A1 | * | 12/2019 | ............... A61Q 7/00 |

OTHER PUBLICATIONS

CN-105434352-A translated (Year: 2015).*
International Search Report of PCT Patent Application No. PCT/CN2021/129965 issued on Dec. 24, 2021.

* cited by examiner

Primary Examiner — Robert A Wax
Assistant Examiner — John Seungjai Kwon

(57) ABSTRACT

The present disclosure provides a compound external preparation for treating alopecia areata and a preparation method therefor. The compound external preparation includes an active ingredient A and an active ingredient B, the active ingredient A is one or more of a JAK inhibitor and a pharmaceutically acceptable salt thereof, and the active ingredient B is minoxidil or a pharmaceutically acceptable salt thereof. The compound external preparation has good efficacy, good solubility, and good storage stability. The preparation method is simple to operate, and is beneficial to increasing solubility and dissolution rate of the active ingredients, as well as storage stability.

12 Claims, 1 Drawing Sheet

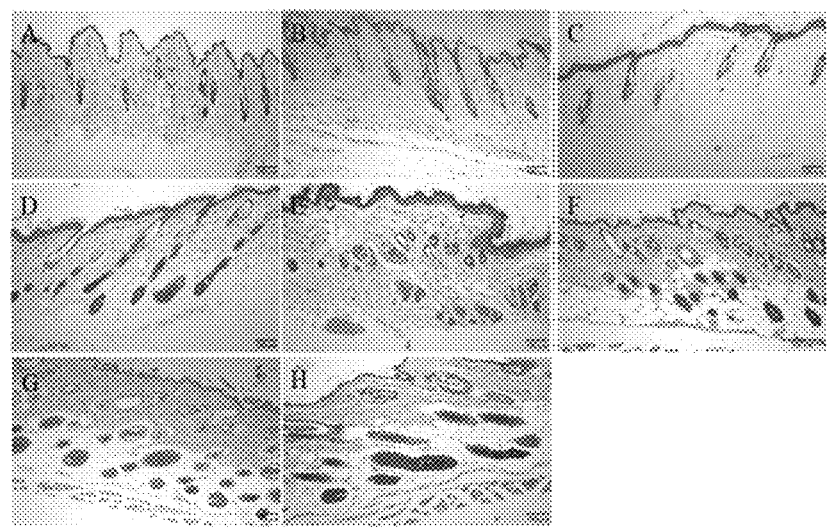

COMPOUND EXTERNAL PREPARATION FOR TREATING ALOPECIA AREATA AND PREPARATION METHOD THEREFOR

The present application claims priority to Chinese Patent Application No. CN202011256258.X filed on Nov. 11, 2020, which is incorporated herein by reference in its entirety.

TECHNICAL FIELD

The present disclosure belongs to the technical field of pharmaceutical preparations, and particularly relates to a compound external preparation for treating alopecia areata and a preparation method therefor.

BACKGROUND

Alopecia areata is a common non-scarring alopecia disease caused by an inflammatory response of hair follicles, and can be divided into localized alopecia areata, alopecia totalis, and alopecia universalis according to the pathological characteristics and severity. The global morbidity is about 1%-2%, and most patients are children and young adults. Alopecia areata affects the appearance and mental health of the patients. The conventional therapeutic agents (including glucocorticoids, compound glycyrrhizin, contact sensitizers, hair growth promoters, and the like) are limited due to side effects, incomplete treatment, effectiveness only in mild alopecia areata, and the like, so that a new therapy needs to be developed.

Alopecia areata is an inflammatory autoimmune disease and is related to the destruction of the immune privilege mechanism of hair follicles, in which an inflammatory cytokine signaling pathway, JAK (Janus kinase)-STAT pathway, plays a key role. In recent years, JAK inhibitors have become a new strategy for treating alopecia areata. The binding of a cytokine to a receptor thereof activates the JAK pathway to phosphorylate STAT, and a STAT dimer is transported to the nucleus to activate gene transcription, so that the cytokine and the autoantigen are further generated, and the inflammation and the immune response are activated. The JAK/STAT signaling pathway participates in the hair growth cycle, is upregulated in the catagen and telogen and is inhibited in the anagen. Blocking the related JAK-STAT pathway can reduce the production of the autoantigen and the inflammatory mediator, and prevents the immune response of hair follicles.

As can be seen from the above, the JAK inhibitors can block the cytokine signaling that plays a key role in the pathogenesis of alopecia areata, and therefore have theoretical advantages over other drugs in terms of efficacy. Currently, the commonly used JAK inhibitors mainly include tofacitinib, ruxolitinib, oclacitinib, baricitinib, and the like. Among them, tofacitinib is the most widely studied non-specific JAK inhibitor, approved in the US and China in 2012 and 2017, respectively, mainly used for treating rheumatoid arthritis and psoriasis. The FDA has not approved it for alopecia areata, but in recent years, many clinical trials have proved its effectiveness in alopecia areata (mainly in alopecia totalis and in alopecia universalis). Tofacitinib prevents the inflammation and the immune response of hair follicles by inhibiting the JAK-STAT pathway, which is an etiological treatment and theoretically has better efficacy on patients with moderate and severe alopecia areata compared with other drugs. However, alopecia areata is prone to recurrence and needs to be controlled by long-term medication. Tofacitinib is an immunosuppressant, and long-term use can reduce the immunity of patients, possibly leading to serious infections and an increased risk of tumors. Moreover, tofacitinib mainly acts on an upstream target to block the inflammation and has an insufficient restoration effect on damaged hairs and hair follicles in the catagen and telogen, which may lead to long hair regeneration time.

Among the drugs approved for the treatment of alopecia areata in China, minoxidil has a good hair growth-promoting effect. Minoxidil acts through the following pathways: (1) stimulating the proliferation of epithelial cells of hair follicles and prolonging the anagen of the hair; (2) promoting angiogenesis to increase local blood supply and providing nutrition for hair growth; (3) opening potassium channels, preventing calcium ions from flowing into cells, and increasing cell DNA synthesis and hair follicle cell proliferation. At present, various external preparations of minoxidil have been marketed at home and abroad, with high safety. However, minoxidil mainly functions to improve microcirculatory disturbance and accelerate hair growth, which is a symptomatic treatment and therefore has a better efficacy only on mild alopecia areata and has little efficacy on alopecia totalis and alopecia universalis that are more harmful.

In addition, the applicant has found in the research that tofacitinib or a pharmaceutically acceptable salt thereof and minoxidil or a pharmaceutically acceptable salt thereof are difficult to dissolve in various solvents, or even if they are dissolved, crystallization is easy to occur during storage, and it is difficult to prepare a compound external preparation that has good solubility, and good storage stability.

To sum up, both tofacitinib for etiological treatment and minoxidil for symptomatic treatment have certain limitations when used for treating alopecia areata alone. There is currently a lack of therapies for continuously and effectively or permanently reversing alopecia areata and alopecia, and there is an urgent need for a compound external preparation that has good efficacy, simple preparation, good solubility and good storage stability.

SUMMARY

To solve problems described above, the present disclosure provides a compound external preparation for treating alopecia areata and a preparation method therefor.

In a first aspect, the present disclosure provides a compound external preparation for treating alopecia areata.

Provided is a compound external preparation for treating alopecia areata, which includes an active ingredient A and an active ingredient B. The active ingredient A is one or more of a JAK inhibitor and a pharmaceutically acceptable salt thereof, and the active ingredient B is minoxidil or a pharmaceutically acceptable salt thereof.

Although tofacitinib or a pharmaceutically acceptable salt thereof and minoxidil or the pharmaceutically acceptable salt thereof have limitations when used for treating alopecia areata alone, they exactly act on different targets in pathogenesis of alopecia areata, respectively, so that they can be considered to be prepared into a compound preparation. The key signaling pathway in the pathogenesis of alopecia areata is inhibited with tofacitinib, and defect of insufficient efficacy of minoxidil on moderate and severe patients is made up etiologically; meanwhile, poor effect of tofacitinib on hair restoration is improved symptomatically with good hair growth-promoting effect of minoxidil. These two drugs have complementary drug effects, and treat both symptoms and root causes. Moreover, a dose of tofacitinib can be properly reduced according to synergistic effect to reduce risk of side effects. In fact, the choice is not limited to tofacitinib. Other common JAK inhibitor drugs such as ruxolitinib, oclacitinib, and baricitinib in combination with minoxidil can all achieve this effect, and tofacitinib is preferred herein.

Currently tofacitinib on the market is only in an form of oral preparation, and risk of the systemic immunosuppressive side effects is high after long-term administration. Compared with the oral preparation, a topical external preparation can serve to avoid hepatic first-pass effect, reduce risk of the systemic side effects, and prolong duration of the drug effect. According to analysis of physicochemical properties, tofacitinib has potential to be prepared as an external preparation, and current minoxidil preparations on the market for treating alopecia and alopecia areata are all external preparations. Therefore, preparing the two into a compound external preparation can make the drug more targeted and safer.

The external preparation may include at least one selected from an ointment, a cream, a tincture, a patch, a gel, a liniment, and a foam, and is preferably a liniment, a gel, or a foam.

Compared with the oral preparation, the external preparation is more locally targeted and can significantly reduce the risk of the systemic side effects, which is of great significance for tofacitinib with an immunosuppressive effect; moreover, the external preparation can prolong duration of the drug with a steady-state concentration of, thereby prolonging the drug effect. The two drugs acting on different targets are prepared into a compound external preparation, which is expected to provide a therapy that is continuously effective and can permanently reverse alopecia for moderate and severe alopecia areata patients.

Common forms of the external preparation may include, but are not limited to, an emulsion, a liniment, a tincture, an ointment, a cream, a patch, a gel, a foam, and the like. Among them, the ointment, the cream, and the patch are not as suitable for hair sites as other preparation forms; in contrast, the foam is light in texture, easy to be distributed on the scalp, good in diffusivity, suitable for large affected areas, free of additional smearing, and good in retentivity, so that patient compliance can be greatly increased.

The compound external foam made of tofacitinib and minoxidil consists of active ingredients tofacitinib and minoxidil and a pharmaceutically acceptable excipient that are directly dissolved in a solvent, the solvent being a mixture of water and alcohol; or consists of an emulsion comprising active ingredients tofacitinib and minoxidil.

Calculated by a JAK inhibitor, the active ingredient A may have a percentage of 0.1 wt %-10 wt % or 0.1% (w/v)-10% (w/v) in the compound external preparation. In some embodiments, calculated by a JAK inhibitor, the active ingredient A has a percentage of 0.1 wt %-5 wt % or 0.1% (w/v)-5% (w/v) in the compound external preparation. In some embodiments, calculated by a JAK inhibitor, the active ingredient A has a percentage of 0.1 wt %-2 wt % or 0.1% (w/v)-2% (w/v) in the compound external preparation.

Calculated by minoxidil, the active ingredient B may have a mass percentage of 0.1 wt %-10 wt % or 0.1% (w/v)-10% (w/v) in the compound external preparation. In some embodiments, calculated by minoxidil, the active ingredient B has a mass percentage of 0.1 wt %-5 wt % or 1% (w/v)-5% (w/v) in the compound external preparation. In some embodiments, calculated by minoxidil, the active ingredient B has a mass percentage of 2 wt %-5 wt % or 2% (w/v)-5% (w/v) in the compound external preparation.

Calculated by a JAK inhibitor and minoxidil, the active ingredient A and the active ingredient B are in a weight ratio of 1:20-10:1 in the compound external preparation. In some embodiments, calculated by a JAK inhibitor and minoxidil, the active ingredient A and the active ingredient B are in a weight ratio of no more than 3:4 in the compound external preparation, which is beneficial to avoiding crystallization of the compound external preparation during storage. In some embodiments, calculated by a JAK inhibitor and minoxidil, the active ingredient A and the active ingredient B are in a weight ratio of 1:10-10:1 in the compound external preparation. In some embodiments, calculated by a JAK inhibitor and minoxidil, the active ingredient A and the active ingredient B are in a weight ratio of 1:5-5:1 in the compound external preparation. In some embodiments, calculated by a JAK inhibitor and minoxidil, the active ingredient A and the active ingredient B are in a weight ratio of 1:3-3:1 in the compound external preparation. In some embodiments, calculated by a JAK inhibitor and minoxidil, the active ingredient A and the active ingredient B are in a weight ratio of 1:10-3:4 in the compound external preparation. In some embodiments, calculated by a JAK inhibitor and minoxidil, the active ingredient A and the active ingredient B are in a weight ratio of 1:5-3:4 in the compound external preparation. In some embodiments, calculated by a JAK inhibitor and minoxidil, the active ingredient A and the active ingredient B are in a weight ratio of 1:3-3:4 in the compound external preparation.

The JAK inhibitor may include at least one selected from tofacitinib, ruxolitinib, oclacitinib, and baricitinib, and is preferably tofacitinib.

The pharmaceutically acceptable salt may include at least one selected from citrate, hydrochloride, oxalate, phosphate, sulfate, fumarate, succinate, tartrate, nitrate, and maleate.

The compound external preparation may further include a solvent and optionally a pharmaceutically acceptable excipient.

The solvent is a mixture of water and alcohol. Because both tofacitinib or a pharmaceutically acceptable salt thereof and minoxidil or a pharmaceutically acceptable salt thereof are hardly soluble drugs, the applicant has found that they are difficult to be completely dissolved at the same time only in water or other single solvents, which influences absorption by the scalp. The applicant has surprisingly found in the research that a mixture of water and alcohol can increase solubility of tofacitinib and minoxidil, and water and alcohol exhibit synergic effect.

The alcohol may include at least one selected from ethanol, propylene glycol, glycerol, and polyethylene glycol. In some embodiments, the alcohol is ethanol or propylene glycol. In some embodiments, the alcohol is propylene glycol; the propylene glycol is beneficial to increasing solubility of the active ingredient A. In some embodiments, the alcohol is ethanol or propylene glycol; the propylene glycol is beneficial to increasing solubility of the active ingredient A, and the ethanol is beneficial to increasing a dissolution rate of the active ingredient A.

In some embodiments, the solvent is a mixture of water and alcohol, the alcohol is propylene glycol, and calculated by a JAK inhibitor and minoxidil, the active ingredient A and the active ingredient B are in a weight ratio of 1:20-10:1 in the compound external preparation. In some embodiments, the solvent is a mixture of water and alcohol, the alcohol is propylene glycol, and calculated by a JAK inhibitor and minoxidil, the active ingredient A and the active ingredient B are in a weight ratio of 1:3-3:1 in the compound external preparation.

In some embodiments, the solvent is a mixture of water and alcohol, the alcohol is propylene glycol and ethanol, and calculated by a JAK inhibitor and minoxidil, the active ingredient A and the active ingredient B are in a weight ratio of 1:10-3:4 in the compound external preparation. In some embodiments, the solvent is a mixture of water and alcohol, the alcohol is propylene glycol and ethanol, and calculated by a JAK inhibitor and minoxidil, the active ingredient A and the active ingredient B are in a weight ratio of 1:5-3:4 in the compound external preparation. In some embodiments, the solvent is a mixture of water and alcohol, the alcohol is propylene glycol and ethanol, and calculated by a JAK inhibitor and minoxidil, the active ingredient A and the active ingredient B are in a weight ratio of 1:3-3:4 in the compound external preparation.

The alcohol and the water may be in a weight ratio of 9:1-1:9. In some embodiments, the alcohol and the water are in a weight ratio of 9:1-1:9. In some embodiments, the alcohol and the water are in a weight ratio of 7:3-3:7. In some embodiments, the alcohol and the water are in a weight ratio of 5:5. In some embodiments, the alcohol and the water are in a weight ratio of 8:2.

The solvent may have a content of 5 wt %-99.8 wt % or 5 wt %-80 wt % in the compound external preparation. In some embodiments, the solvent may have a content of 50 wt %-99.8 wt % in the compound external preparation. In some embodiments, the solvent may have a content of 60 wt %-99.8 wt % in the compound external preparation. In some embodiments, the solvent may have a content of 70 wt %-99.8 wt % in the compound external preparation. In some embodiments, the solvent may have a content of 80 wt %-99.8 wt % in the compound external preparation. In some embodiments, the solvent has a content of 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, 99.7 wt %, or 99.8 wt % in the compound external preparation.

The pharmaceutically acceptable excipient may include at least one selected from a penetration enhancer, a surfactant, a crystallization inhibitor, a foam adjuvant, a thickening agent, a gel matrix, an antioxidant, and an antibacterial agent.

A pharmaceutically acceptable excipient in the liniment may include at least one selected from a penetration enhancer, a surfactant, a crystallization inhibitor, an antioxidant, and an antibacterial agent.

A pharmaceutically acceptable excipient in the gel may include at least one selected from a penetration enhancer, a surfactant, a crystallization inhibitor, a gel matrix, an antioxidant, and an antibacterial agent.

A pharmaceutically acceptable excipient in the foam may include at least one selected from a thickening agent, a penetration enhancer, a crystallization inhibitor, an antioxidant, a foam adjuvant, and an antibacterial agent. The surfactant is closely related to production and stabilization of the foam; meanwhile, the surfactant acts as an emulsifier, and an oil-in-water emulsion requires that a HLB of an emulsifier system is 9-14. The thickening agent may prolong foam durability and improve foam retentivity. In addition, the foam adjuvant may improve emulsion stabilizing ability of the surfactant and increase the foam stability.

The penetration enhancer may include at least one selected from menthol, eucalyptol, oleic acid, isopropyl myristate, ethanol, propylene glycol, sodium dodecyl sulfate, poloxamer, and diethylene glycol monoethyl ether.

The menthol may be L-menthol.

The penetration enhancer may have a content of 1 wt %-30 wt % or 1% (w/v)-30% (w/v) or 1 wt %-10 wt % or 1% (w/v)-10% (w/v) in the compound external preparation.

The surfactant may include at least one selected from Tween 80, poloxamer, Span, Brij, sodium dodecyl sulfate, polyethoxylated castor oil, and sodium fatty alcohol polyoxyethylene ether sulfate. In some embodiments, the surfactant includes at least one selected from Tween 80, poloxamer, and sodium dodecyl sulfate.

The surfactant may have a content of 0.5 wt %-10 wt % in the compound external preparation. In some embodiments, the surfactant has a content of 1.0 wt %-8 wt % in the compound external preparation. In some embodiments, the surfactant has a content of 1 wt %-5 wt % in the compound external preparation. In some embodiments, the surfactant has a content of 2 wt %-5 wt % in the compound external preparation.

The crystallization inhibitor may include at least one selected from povidone, sodium dodecyl sulfate, sorbitol, hydroxypropyl methylcellulose, and levulinic acid.

The crystallization inhibitor may have a content of 0.1 wt %-10 wt % or 0.1% (w/v)-10% (w/v) in the compound external preparation.

The thickening agent or the gel matrix may include at least one selected from glycerol, polyvinyl alcohol, polyvinylpyrrolidone, sodium alginate, xanthan gum, sodium carboxymethylcellulose, hydroxypropyl methylcellulose, methyl cellulose, and carbomer. In some embodiments, the thickening agent or the gel matrix includes at least one selected from glycerol, polyvinyl alcohol, polyvinylpyrrolidone, xanthan gum, and sodium carboxymethylcellulose.

The thickening agent or the gel matrix may have a content of 0.5 wt %-10 wt % in the compound external preparation. In some embodiments, the thickening agent or the gel matrix has a content of 1.0 wt %-8 wt % in the compound external preparation. In some embodiments, the thickening agent or the gel matrix has a content of 1 wt %-5 wt % in the compound external preparation. In some embodiments, the thickening agent or the gel matrix has a content of 2 wt %-5 wt % in the compound external preparation.

The foam adjuvant may include at least one selected from cetyl alcohol, stearyl alcohol, arachidyl alcohol, stearic acid, arachidic acid, and oleyl alcohol. In some embodiments, the foam adjuvant is cetyl alcohol or stearyl alcohol.

The foam adjuvant may have a content of 0.5 wt %-10 wt % in the compound external preparation. In some embodiments, the foam adjuvant has a content of 1.0 wt %-8 wt % in the compound external preparation. In some embodiments, the foam adjuvant has a content of 1 wt %-5 wt % in the compound external preparation. In some embodiments, the foam adjuvant has a content of 2 wt %-5 wt % in the compound external preparation.

The antioxidant may include at least one selected from sodium sulfite, sodium bisulfite, sodium thiosulfate, sodium metabisulfite, ascorbic acid, ascorbyl palmitate, propyl gallate, tocopherol, butylhydroxyanisole, dibutylhydroxytoluene, and edetate disodium.

The antioxidant may have a content of 0.005 wt %-2 wt % or 0.005% (w/v)-2 (w/v) in the compound external preparation.

The antibacterial agent may include at least one selected from benzoic acid and a sodium salt thereof, propionic acid, sodium lactate, sorbic acid and a potassium salt thereof, paraben, dimethyl fumarate, and sodium dehydroacetate.

The antibacterial agent may have a content of 0.01 wt %-5 wt % or 0.01% (w/v)-5% (w/v) in the compound external preparation.

The foam may further include a propellant.

The propellant may be a hydrocarbon gas or a hydrofluoroalkane liquefied gas with a boiling point lower than a room temperature at a normal pressure.

The hydrocarbon gas may include at least one selected from propane, butane, and isobutane, and a mixture thereof.

The hydrofluoroalkane liquefied gas may include at least one selected from tetrafluoroethane, heptafluoropropane, and dimethyl ether, and a mixture thereof. In some embodiments, the hydrofluoroalkane liquefied gas is tetrafluoroethane.

The propellant may have a content of 2 wt %-25 wt % in the compound external preparation. In some embodiments, the propellant has a content of 2 wt %-10 wt % in the compound external preparation. In some embodiments, the propellant has a content of 2 wt %-5 wt % in the compound external preparation.

The foam may include an oil-in-water, water-in-oil, or multiple emulsion consisting of the active ingredient A, the active ingredient B, an aqueous medium, an oily medium, and the pharmaceutically acceptable excipient, and is preferably an oil-in-water emulsion. It is prepared as an emulsion, so that the drug can be quickly absorbed and exert drug effect due to large dispersion of liquid drops, and irritation of alcohol to skin and risk of drug precipitation caused by solvent volatilization can be reduced. The oil-in-water emulsion wraps the drug that is difficult to dissolve in water in an oil phase, which is then dispersed in an aqueous phase, so that uniformity of drug distribution is improved, and not only the moisture retention property can be improved with the aqueous phase, but also moistening property can be improved with the oil phase.

The aqueous medium may include at least one selected from water, ethanol, propylene glycol, glycerol, and polyethylene glycol. In some embodiments, the aqueous medium is at least one of water or polyethylene glycol.

The aqueous medium may have a total content of 5 wt %-80 wt % in the compound external preparation; and/or the oily medium includes at least one selected from silicone oil, mineral oil, vegetable oil, and polyunsaturated fatty acid; and/or the oily medium has a total content of 5 wt %-80 wt % in the compound external preparation;
the silicone oil may include at least one selected from dimethicone and cyclomethicone.

The mineral oil may include at least one selected from liquid paraffin and vaseline.

The vegetable oil may include at least one selected from coconut oil, soybean oil, and isopropyl myristate.

The polyunsaturated fatty acid may include at least one selected from linoleic acid and linolenic acid.

In some embodiments, the liniment includes the active ingredient A, the active ingredient B, a solvent, and optionally a pharmaceutically acceptable excipient; calculated by a JAK inhibitor, the active ingredient A has a percentage of 0.1 wt %-10 wt % in the compound external preparation; calculated by minoxidil, the active ingredient B has a mass percentage of 0.1% (w/v)-10% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-99.8 wt % in the liniment; and the pharmaceutically acceptable excipient has a content of 0-20 wt % in the liniment.

In some embodiments, the liniment includes the active ingredient A, the active ingredient B, a solvent, and optionally a pharmaceutically acceptable excipient; calculated by a JAK inhibitor, the active ingredient A has a percentage of 0.1 wt %-5.0 wt % in the compound external preparation; calculated by minoxidil, the active ingredient B has a mass percentage of 1.0% (w/v)-5.0% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-98.9 wt % in the liniment; and the pharmaceutically acceptable excipient has a content of 0-20 wt % in the liniment.

In some embodiments, the liniment includes the active ingredient A, the active ingredient B, a solvent, and optionally a pharmaceutically acceptable excipient; calculated by a JAK inhibitor, the active ingredient A has a percentage of 0.1 wt %-2.0 wt % in the compound external preparation; calculated by minoxidil, the active ingredient B has a mass percentage of 2.0% (w/v)-5.0% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-97.9 wt % in the liniment; and the pharmaceutically acceptable excipient has a content of 0-20 wt % in the liniment.

In some embodiments, the gel includes the active ingredient A, the active ingredient B, a solvent, and a pharmaceutically acceptable excipient; the pharmaceutically acceptable excipient includes a gel matrix and optionally other excipients, and the other excipients include at least one selected from a penetration enhancer, a surfactant, a crystallization inhibitor, an antioxidant, and an antibacterial agent; calculated by a JAK inhibitor, the active ingredient A has a percentage of 0.1 wt %-10 wt % in the compound external preparation; calculated by minoxidil, the active ingredient B has a mass percentage of 0.1% (w/v)-10% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-99.7 wt % in the compound external preparation; and the gel matrix has a content of 0.1 wt %-30 wt % in the compound external preparation, and the other excipients have a content of 0-20 wt % in the compound external preparation.

In some embodiments, the gel includes the active ingredient A, the active ingredient B, a solvent, and a pharmaceutically acceptable excipient; the pharmaceutically acceptable excipient includes a gel matrix and optionally other excipients, and the other excipients include at least one selected from a penetration enhancer, a surfactant, a crystallization inhibitor, an antioxidant, and an antibacterial agent; calculated by a JAK inhibitor, the active ingredient A has a percentage of 0.1 wt %-5 wt % in the compound external preparation; calculated by minoxidil, the active ingredient B has a mass percentage of 1% (w/v)-5% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-98.8 wt % in the compound external preparation; and the gel matrix has a content of 0.1 wt %-30 wt % in the compound external preparation, and the other excipients have a content of 0-20 wt % in the compound external preparation.

In some embodiments, the gel includes the active ingredient A, the active ingredient B, a solvent, and a pharmaceutically acceptable excipient; the pharmaceutically acceptable excipient includes a gel matrix and optionally other excipients, and the other excipients include at least one selected from a penetration enhancer, a surfactant, a crystallization inhibitor, an antioxidant, and an antibacterial agent; calculated by a JAK inhibitor, the active ingredient A has a percentage of 0.1 wt %-2 wt % in the compound external preparation; calculated by minoxidil, the active ingredient B has a mass percentage of 2% (w/v)-5% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-97.8 wt % in the compound external preparation; and the gel matrix has a content of 0.1 wt %-30 wt % in the compound external preparation, and the other excipients have a content of 0-20 wt % in the compound external preparation.

In some embodiments, the foam includes the active ingredient A, the active ingredient B, a solvent, a propellant, and a pharmaceutically acceptable excipient; the pharmaceutically acceptable excipient includes a thickening agent, a surfactant, and optionally other excipients, and the other excipients include at least one selected from a penetration enhancer, a crystallization inhibitor, an antioxidant, a foam adjuvant, and an antibacterial agent; calculated by a JAK inhibitor, the active ingredient A has a percentage of 0.1 wt %-10 wt % in the compound external preparation; calculated by minoxidil, the active ingredient B has a mass of 0.1% (w/v)-10% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-96.8 wt % in the compound external preparation; the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation.

In some embodiments, the foam includes the active ingredient A, the active ingredient B, a solvent, a propellant, and a pharmaceutically acceptable excipient; the pharmaceutically acceptable excipient includes a thickening agent, a surfactant, and optionally other excipients, and the other excipients include at least one selected from a penetration enhancer, a crystallization inhibitor, an antioxidant, a foam adjuvant, and an antibacterial agent; calculated by a JAK inhibitor, the active ingredient A has a percentage of 0.1 wt %-5 wt % in the compound external preparation; calculated by minoxidil, the active ingredient B has a mass of 1% (w/v)-5% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-95.9 wt % in the compound external preparation; the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation.

In some embodiments, the foam includes the active ingredient A, the active ingredient B, a solvent, a propellant, and a pharmaceutically acceptable excipient; the pharmaceutically acceptable excipient includes a thickening agent, a surfactant, and optionally other excipients, and the other excipients include at least one selected from a penetration enhancer, a crystallization inhibitor, an antioxidant, a foam adjuvant, and an antibacterial agent; calculated by a JAK inhibitor, the active ingredient A has a percentage of 0.1 wt %-2 wt % in the compound external preparation; calculated by minoxidil, the active ingredient B has a mass of 2% (w/v)-5% (w/v) in the compound external preparation; the solvent is a mixture of water and alcohol; the alcohol includes at least one selected from ethanol, propylene glycol, glycerol, and polyethylene glycol, and is preferably ethanol and/or propylene glycol; the solvent has a content of 50 wt %-94.9 wt % in the compound external preparation; the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation.

In some embodiments, on a basis of a total mass or total volume of the liniment, the liniment includes 1.5 wt % of tofacitinib citrate calculated by tofacitinib, 5.0% (w/v) of minoxidil, 0.1 wt % dibutylhydroxytoluene, 50.0 wt % of propylene glycol, and 30.0 wt % of ethanol, with balance being water.

In some embodiments, on a basis of a total mass or total volume of the liniment, the liniment includes 0.5 wt % of tofacitinib citrate calculated by tofacitinib, 2.0% (w/v) of minoxidil, 0.1 wt % of butylhydroxyanisole, 20.0 wt % of propylene glycol, and 30.0 wt % of ethanol, with balance being water.

In some embodiments, on a basis of a total mass or total volume of the gel, the gel includes 1.5 wt % of tofacitinib citrate calculated by tofacitinib, 5.0% (w/v) of minoxidil, 2.0 wt % of L-menthol, 2.0 wt % of sodium carboxymethylcellulose, and 65.0 wt % of propylene glycol, with the balance being water.

In some embodiments, on a basis of a total mass or total volume of the gel, the gel includes 1.5 wt % of tofacitinib citrate calculated by tofacitinib, 2.0% (w/v) of minoxidil, 2.0 wt % of sodium carboxymethylcellulose, 50.0 wt % of propylene glycol, and 15.0 wt % of ethanol, with balance being water.

In some embodiments, on a basis of a total mass or total volume of the foam, the foam includes 1.5 wt % of tofacitinib citrate calculated by tofacitinib, 2.0% (w/v) of minoxidil, 4.0 wt % of Tween 80, 3.0 wt % of xanthan gum, 3.0 wt % of cetyl alcohol, 20.0 wt % of propylene glycol, 30.0 wt % of ethanol, and 5.0 wt % of hydrofluoroalkane compound or mixture, with balance being water.

In some embodiments, on a basis of a total mass or total volume of the foam, the foam includes 1.5 wt % of tofacitinib citrate calculated by tofacitinib, 5.0% (w/v) of minoxidil, 2.0 wt % of sodium dodecyl sulfate, 4.0 wt % of polyvinyl alcohol, 3.0 wt % of cetyl alcohol, 50.0 wt % of propylene glycol, 10.0 wt % of ethanol, and 5.0 wt % of hydrofluoroalkane compound or mixture, with the balance being water.

In some embodiments, on a basis of a total mass or total volume of the foam, the foam includes 0.1 wt %-10 wt % of active ingredient A, 0.1% (w/v)-10% (w/v) of active ingredient B, 5 wt %-80 wt % of water, 5 wt %-80 wt % of polyethylene glycol 400, 5 wt %-25 wt % of hydrofluoroalkane compound or mixture, 0.5 wt %-10 wt % of Tween 80, 0.5 wt %-10 wt % of xanthan gum, 0.5 wt %-10 wt % of glycerol, and 0.5 wt %-10 wt % of cetyl alcohol.

In some embodiments, on a basis of a total mass or total volume of the foam, the foam includes 2 wt % of active ingredient A, 2% (w/v) of active ingredient B, 54 wt % of water, 25 wt % of polyethylene glycol 400, 10 wt % of tetrafluoroethane, 1 wt % of Tween 80, 1 wt % of xanthan gum, 4 wt % of glycerol, and 1 wt % of cetyl alcohol.

In some embodiments, on a basis of a total mass or total volume of the foam, the foam includes 0.1 wt %-10 wt % of active ingredient A, 0.1% (w/v)-10% (w/v) of active ingredient B, 5 wt %-25 wt % of hydrofluoroalkane compound or mixture, 5 wt %-80 wt % of water, 5 wt %-80 wt % of polyethylene glycol 400, 5 wt %-80 wt % of vegetable oil, 0.5 wt %-10 wt % of Tween 80, 0.5 wt %-10 wt % of xanthan gum, 0.5 wt %-10 wt % of glycerol, and 0.5 wt %-10 wt % of cetyl alcohol.

In some embodiments, on a basis of a total mass or total volume of the foam, the foam includes 2 wt % of active ingredient A, 2% (w/v) of active ingredient B, 38 wt % of water, 30 wt % of polyethylene glycol 400, 10 wt % of tetrafluoroethane, 4 wt % of soybean oil, 3 wt % of coconut oil, 3 wt % of isopropyl myristate, 2 wt % of Tween 80, 1 wt % of xanthan gum, 4 wt % of glycerol, and 1 wt % of cetyl alcohol.

In some embodiments, on a basis of a total mass or total volume of the foam, the foam includes 1.5 wt % of active ingredient A, 2% (w/v) of active ingredient B, 41.5 wt % of water, 30 wt % of polyethylene glycol 400, 10 wt % of tetrafluoroethane-heptafluoropropane mixture, 4 wt % of soybean oil, 3 wt % of isopropyl myristate, 2 wt % of Tween 80, 1 wt % of xanthan gum, 4 wt % of glycerol, and 1 wt % of cetyl alcohol.

In a second aspect, the present disclosure provides a preparation method for the compound external preparation according to the first aspect.

In some embodiments, the compound external preparation is a foam, and a preparation method for the foam includes directly dissolving the active ingredient A, the active ingredient B, and a pharmaceutically acceptable excipient in a solvent to obtain the foam.

In some embodiments, the compound external preparation is a foam, and a preparation method for the foam includes preparing the active ingredient A and the active ingredient B into an emulsion.

In some embodiments, the compound external preparation is a foam, and a preparation method for the foam includes directly dissolving the active ingredient A, the active ingredient B, and a pharmaceutically acceptable excipient in a solvent, which is directly added into a hand-press net-type foam emulsion generating device so as to form the foam by pressing the device, or which is filled in a pressurized container so as to form the foam by pressing a valve after a propellant is filled.

In some embodiments, the compound external preparation is a foam, and a preparation method for the foam includes preparing the active ingredient A and the active ingredient B into an emulsion; and directly adding the emulsion into a hand-press net-type foam emulsion generating device and pressing the device to form the foam, or filling a pressurized container with the emulsion, followed by a propellant, and pressing a valve to form the foam. The compound external preparation is prepared as the emulsion, so that drugs can be quickly absorbed and exert medicine effect due to large dispersion of liquid drops, and irritation of alcohol to the skin and risk of drug precipitation caused by solvent volatilization can be reduced. An oil-in-water emulsion wraps drug which is difficult to dissolve in water in an oil phase, which is then dispersed in an aqueous phase, so that uniformity of drug distribution is improved, and not only moisture retention property be improved with the aqueous phase, but also moistening property can be improved with the oil phase.

In some embodiments, the compound external preparation is a foam, the foam is a water-alcohol foam, and a preparation method for the water-alcohol foam includes mixing the active ingredient A, the active ingredient B, a surfactant, a thickening agent, and a foam adjuvant with a solvent, which is homogenized by using a homogenizer or ultrasonically dissolved, and filled into a hand-press net-type foam emulsion pump bottle, or filled into a pressurized container which is then filled with a propellant, so as to obtain the foam.

In some embodiments, the compound external preparation is a foam, the foam is a water-alcohol foam, and a preparation method for the water-alcohol foam includes slowly adding Tween 80, sodium dodecyl sulfate, tofacitinib, minoxidil, glycerol, polyvinylpyrrolidone, xanthan gum, and cetyl alcohol into a mixed solvent formed by water, polyethylene glycol 400 and propylene glycol under stirring, which is then homogenized or ultrasonically dissolved; filling a hand-press net-type foam emulsion pump bottle with a prepared pre-foaming mixture, or filling the prepared pre-foaming mixture into a pressurized container, which is filled with tetrafluoroethane, so as to obtain the foam.

In some embodiments, the compound external preparation is a foam, the foam is an emulsion foam, and a preparation method for the emulsion foam includes:
(1) preparation of an aqueous phase mixture: mixing a surfactant and a thickening agent with an aqueous medium, and heating the mixture to 50-70° C. for dissolution;
(2) preparation of an oil phase mixture: dissolving a foam adjuvant, the active ingredient A, and the active ingredient B in an oily medium at 50-70° C.;
(3) mixing: pouring the oil phase mixture into an aqueous phase under stirring, which is emulsified by using a homogenizer, and then cooled to a room temperature so as to obtain a pre-foaming mixture; and
(4) filling: filling a hand-press net-type foam emulsion pump bottle with the prepared pre-foaming mixture, or filling the prepared pre-foaming mixture into a pressurized container which is then filled with tetrafluoroethane, so as to obtain the foam.

In some embodiments, the compound external preparation is a foam, the foam is an emulsion foam, and a preparation method for the emulsion foam includes following steps:
(1) preparation of an aqueous phase mixture: adding xanthan gum, polyvinylpyrrolidone, sodium dodecyl sulfate, Tween 80, glycerol, and the like into a mixed solvent of water and polyethylene glycol 400 under stirring, and heating the mixture to 50-70° C. for dissolution;
(2) preparation of an oil phase mixture: heating soybean oil, coconut oil, and isopropyl myristate to 50-70° C., adding cetyl alcohol, stearyl alcohol, tofacitinib, and minoxidil under stirring, and dissolving the mixture;
(3) mixing: slowly pouring the hot oil phase mixture into a hot aqueous phase under stirring, which is emulsified by using a homogenizer, and then cooled to a room temperature so as to obtain a pre-foaming mixture; and (4) filling: filling a hand-press net-type foam emulsion pump bottle with the prepared pre-foaming mixture, or filling the prepared pre-foaming mixture into a pressurized container which is filled with tetrafluoroethane, so as to obtain the foam.

In some embodiments, the compound external preparation is a liniment, and a preparation method for the liniment includes dissolving the active ingredient A, the active ingredient B, and optionally a pharmaceutically acceptable excipient in a solvent to obtain the liniment.

In some embodiments, the compound external preparation is a liniment, and a preparation method for the liniment includes dissolving the active ingredient B in a mixture of water and alcohol, adding ethanol and the active ingredient A, optionally adding other pharmaceutically acceptable excipients and dissolving so as to obtain the liniment.

In some embodiments, the compound external preparation is a gel, and a preparation method for the gel includes dissolving the active ingredient B in a mixture of water and alcohol to obtain a drug solution, mixing a suspension comprising the gel matrix with the drug solution, and adding and mixing other pharmaceutically acceptable excipients to obtain the gel.

In some embodiments, the compound external preparation is a gel, and a preparation method for the gel includes:

heating a mixed solvent of water and alcohol at 70° C., adding and dissolving minoxidil, and adding and dissolving tofacitinib citrate to obtain a drug solution; and adjusting a temperature to 50-60° C., slowly adding a gel matrix into the drug solution which is homogeneously stirred, and cooled to a room temperature, and adding a penetration enhancer and stirring so as to obtain the gel.

In some embodiments, when the active ingredient A and the active ingredient B are dissolved in a solvent, firstly the active ingredient B is added and mixed, and then the active ingredient A is added and dissolved. In some embodiments, when the active ingredient A and the active ingredient B are dissolved in a solvent, firstly the active ingredient B is added and mixed with the solvent for 1 min-20 min, and then the active ingredient A is added and dissolved. In some embodiments, when the active ingredient A and the active ingredient B are dissolved in a solvent, the active ingredient B is added and mixed with the solvent for 2-10 min, and then the active ingredient A is added and dissolved. With the active ingredient B being firstly added and mixed and then the active ingredient A being added and dissolved, a dissolution rate of the active ingredient A can be facilitated to be increased.

In some embodiments, when the active ingredient A and the active ingredient B are dissolved in a solvent, firstly the active ingredient B is added and dissolved in a mixed solvent of propylene glycol and water, and then ethanol and the active ingredient A are added, which is beneficial to increasing a dissolution rate of the active ingredient A.

In some embodiments, when tofacitinib or a pharmaceutically acceptable salt thereof and minoxidil are dissolved in a solvent, minoxidil is added and dissolved in a mixed solvent of propylene glycol and water, and then ethanol and tofacitinib or a pharmaceutically acceptable salt thereof are added, which is beneficial to increasing a dissolution rate of tofacitinib or a pharmaceutically acceptable salt thereof.

Beneficial Effects

Compared with the related art, the present disclosure has at least one of the following beneficial effects:
(1) The present disclosure provides a compound external preparation for treating alopecia areata, which can act on different targets of the pathogenesis of alopecia areata through tofacitinib and minoxidil to exert synergic effect, enhance efficacy on alopecia areata, especially on moderate and severe alopecia areata, and reduce the dose and toxic and side effects of tofacitinib and minoxidil. Meanwhile, the compound external preparation is preferably designed as a foam that is light in texture and easy to uniformly distribute on the scalp, so that the applicability to hair sites and the compliance of patients can be increased. By improving the preparation form into an emulsion, the solubility and the transdermal permeability of the active ingredient can be improved, the duration of the drug effect can be prolonged, and the toxic and side effects of the active ingredients can be reduced.
(2) By adopting the mixture of water and alcohol as the solvent, the solubility of tofacitinib or a pharmaceutically acceptable salt thereof and minoxidil or a pharmaceutically acceptable salt thereof can be increased, which is beneficial to preparing the compound external preparation and avoiding the crystallization during the storage.
(3) By adopting the mixture of water and alcohol as the solvent, with a weight ratio of 1:9-9:1, preferably 3:7-7:3, the solubility of tofacitinib or a pharmaceutically acceptable salt thereof and minoxidil or a pharmaceutically acceptable salt thereof can be increased, which is beneficial to preparing the compound external preparation and avoiding the crystallization during the storage.
(4) By adopting the mixture of water and alcohol as the solvent, and with the alcohol being propylene glycol and ethanol, the propylene glycol is beneficial to improving the solubility of the active ingredient A, and the ethanol is beneficial to increasing the dissolution rate of the active ingredient A.
(5) Calculated by a JAK inhibitor and minoxidil, the active ingredient A and the active ingredient B are in a weight ratio of no more than 3:4 in the compound external preparation, which is beneficial to avoiding the crystallization of the compound external preparation during the storage.
(6) In the process of preparing the compound external preparation, when the active ingredient A and the active ingredient B are dissolved in the solvent, firstly the active ingredient B is added and mixed, and then the active ingredient A is added and dissolved, which is beneficial to increasing the dissolution rate of the active ingredient A.
(7) When the active ingredient A and the active ingredient B are dissolved in the solvent, firstly the active ingredient B is added and dissolved in a mixed solvent of propylene glycol and water, and then ethanol and the active ingredient A are added, which is beneficial to increasing the dissolution rate of the active ingredient A.
(8) When tofacitinib or a pharmaceutically acceptable salt thereof and minoxidil are dissolved in the solvent, firstly minoxidil is added and dissolved in a mixed solvent of propylene glycol and water, and then ethanol and tofacitinib or a pharmaceutically acceptable salt thereof are added, which is beneficial to increasing the dissolution rate of tofacitinib or a pharmaceutically acceptable salt thereof.

DESCRIPTION OF THE TERMS

A term "pharmaceutically acceptable" refers to those compounds, materials, compositions, and/or preparation forms that are, within a scope of reasonable medical judgment, suitable for use in contact with tissues of patients without excessive toxicity, irritation, allergic response or other problems or complications commensurate with a reasonable benefit/risk ratio, and are effective for intended use.

A term "optional" or "optionally" means that subsequently described events or circumstances may, but does not necessarily, occur, and this description includes instances where the events or circumstances occur and instances where they does not occur. For example, "optionally pharmaceutically acceptable excipient" means that a pharmaceutically acceptable excipient may or may not be present.

A term "room temperature" refers to an ambient room temperature, which may be 20-30° C.

A term "weight percentage" or "percentage by weight" or "wt %" is defined as follows: a weight of an individual component in a composition is divided by a total weight of all components in the composition and multiplied by 100%.

A term "% (w/v)" means that a weight of an individual component in a composition is divided by a total volume of the composition and multiplied by 100%.

A term "and/or" should be understood to refer to any one of options or any two or more of the options.

BRIEF DESCRIPTION OF THE DRAWINGS

The sole FIGURE shows pathological images (HE staining) of skin tissues at the modeling site of mice of test groups in Example 51; in which image A indicates a blank control group, image B indicates a blank gel group, image C indicates a minoxidil 1 group, image D indicates a minoxidil 2 group, image E indicates a tofacitinib group, image F indicates a compound low-dose group, image G indicates a compound medium-dose group, and image H indicates a compound high-dose group.

DETAILED DESCRIPTION

In the following description, numerous specific details are set forth to facilitate full understanding of the present disclosure. This present disclosure may, however, be implemented in many other ways than those described herein, and similar modifications can be made by those skilled in the art without departing from the spirit of the present disclosure. Therefore, the present disclosure is not limited by specific implementation disclosed below.

Unless otherwise defined, all technical and scientific terms used herein have the same meaning as commonly understood by those skilled in the art to which the present disclosure belongs. The terms used in the specification of the present disclosure herein are for the purpose of describing specific examples only and are not intended to limit the scope of the present disclosure.

Example 1

Water-Alcohol Foam (1) Formula

| Component | Content (on basis of total mass or total volume of composition) |
|---|---|
| Tofacitinib | 1.5 wt % |
| Minoxidil | 2% (w/v) |
| Sodium dodecyl sulfate | 2 wt % |
| Tween 80 | 1 wt % |
| Glycerol | 4 wt % |
| Polyvinylpyrrolidone | 2 wt % |
| Xanthan gum | 1 wt % |
| Cetyl alcohol | 1 wt % |
| Propylene glycol | 8 wt % |
| PEG 400 | 25 wt % |
| Tetrafluoroethane | 10 wt % |
| Purified water | Balance |

(2) Preparation Method

Purified water, PEG 400, and propylene glycol according to the formula amount were added into a formulation container, and stirred homogeneously to form a mixed solvent. Tween 80, sodium dodecyl sulfate, tofacitinib, minoxidil, glycerol, polyvinylpyrrolidone, xanthan gum, and cetyl alcohol according to the formula amount were slowly added under stirring, then homogenized or ultrasonically dissolved to obtain a pre-foaming mixture. A pressurized container was filled with the prepared pre-foaming mixture, followed by tetrafluoroethane, to obtain the foam.

Example 2

Water-Alcohol Foam (1) Formula

| Component | Content (on a basis of a total mass or total volume of composition) |
|---|---|
| Tofacitinib | 1.5 wt % |
| Minoxidil | 2% (w/v) |
| Sodium fatty alcohol polyoxyethylene ether sulfate | 2 wt % |
| Tween 80 | 1 wt % |
| Glycerol | 4 wt % |
| Hydroxypropyl methylcellulose | 1.5 wt % |
| Carbomer | 1 wt % |
| Stearyl alcohol | 1 wt % |
| Ethanol | 10 wt % |
| PEG 400 | 30 wt % |
| Purified water | Balance |

(2) Preparation Method

Purified water, PEG 400, and ethanol according to the formula amount were added into a formulation container, and stirred homogeneously to form a mixed solvent. Tween 80, sodium fatty alcohol polyoxyethylene ether sulfate, tofacitinib, minoxidil, glycerol, hydroxypropyl methylcellulose, carbomer, and stearyl alcohol according to the formula amount were slowly added under stirring, then homogenized or ultrasonically dissolved to obtain a pre-foaming mixture. The prepared pre-foamed mixture was added into a hand-press net-type foam emulsion pump bottle to obtain the foam.

Example 3

Emulsion Foam (1) Formula

| Component | Content (on a basis of a total mass or total volume of composition) |
|---|---|
| Tofacitinib | 1.5 wt % |
| Minoxidil | 2% (w/v) |
| Soybean oil | 4 wt % |
| Coconut oil | 3 wt % |
| Isopropyl myristate | 3 wt % |
| Cetyl alcohol | 1 wt % |
| Stearyl alcohol | 2 wt % |
| Xanthan gum | 1 wt % |
| Polyvinylpyrrolidone | 1 wt % |
| Sodium dodecyl sulfate | 2 wt % |
| Tween 80 | 2 wt % |
| Glycerol | 4 wt % |
| PEG 400 | 30 wt % |
| Tetrafluoroethane-heptafluoropropane | 10 wt % |
| Purified water | Balance |

(2) Preparation Method

Preparation of an aqueous phase mixture: xanthan gum, polyvinylpyrrolidone, sodium dodecyl sulfate, Tween 80, glycerol, and the like according to the formula amount were added into a mixed solvent of water and polyethylene glycol 400 under stirring, and the mixture was heated to 50° C. for dissolution.

Preparation of an oil phase mixture: soybean oil, coconut oil, and isopropyl myristate were heated to 50° C., cetyl alcohol, stearyl alcohol, tofacitinib, and minoxidil according to the formula amount were added under stirring for dissolution.

Mixing: the hot oil phase mixture was slowly poured into a hot aqueous phase under stirring, which was emulsified by using a homogenizer and cooled to a room temperature so as to obtain a pre-foaming mixture.

Filling: A pressurized container was filled with the prepared pre-foaming mixture, followed by with a tetrafluoroethane-heptafluoropropane mixture, so as to obtain the foam.

Example 4

Emulsion Foam (1) Formula

| Component | Content (on a basis of a total mass or total volume of composition) |
|---|---|
| Tofacitinib | 1.5 wt % |
| Minoxidil | 2% (w/v) |
| Soybean oil | 5 wt % |
| Mineral oil | 3 wt % |
| Isopropyl myristate | 2 wt % |
| Oleyl alcohol | 4 wt % |
| Arachidic acid | 2 wt % |
| Sodium alginate | 1 wt % |
| Carbomer | 1 wt % |
| Sodium fatty alcohol polyoxyethylene ether sulfate | 2 wt % |
| Tween 80 | 2 wt % |
| Glycerol | 5 wt % |
| PEG 400 | 25 wt % |
| Purified water | Balance |

(2) Preparation Method

Preparation of an aqueous phase mixture: sodium alginate, carbomer, sodium fatty alcohol polyoxyethylene ether sulfate, Tween 80, glycerol, and the like according to the formula amount were added into a mixed solvent of water and polyethylene glycol 400 under stirring, and the mixture was heated to 50° C. for dissolution.

Preparation of an oil phase mixture: soybean oil, mineral oil, and isopropyl myristate were heated to 50° C., oleyl alcohol, arachidic acid, tofacitinib, and minoxidil according to the formula amount were added under stirring for dissolution.

Mixing: the hot oil phase was slowly poured into a hot aqueous phase under stirring, which was emulsified by using a homogenizer and cooled to the room temperature so as to obtain a pre-foaming mixture.

Filling: the prepared pre-foamed mixture was added into a hand-press net-type foam emulsion pump bottle so as to obtain the foam.

Comparative Example 1

Tofacitinib Water-Alcohol Foam (1) Formula

| Component | Content (on a basis of a total mass of composition) |
|---|---|
| Tofacitinib | 1.5 wt % |
| Sodium dodecyl sulfate | 2 wt % |
| Tween 80 | 1 wt % |
| Glycerol | 4 wt % |
| Polyvinylpyrrolidone | 2 wt % |
| Xanthan gum | 1 wt % |
| Cetyl alcohol | 1 wt % |
| Propylene glycol | 8 wt % |
| PEG 400 | 25 wt % |
| Tetrafluoroethane | 10 wt % |
| Purified water | Balance |

(2) Preparation Method

Purified water, PEG 400, and propylene glycol according to the formula amount were added into a formulation container, and stirred homogeneously to form a mixed solvent. Tween 80, sodium dodecyl sulfate, tofacitinib, glycerol, polyvinylpyrrolidone, xanthan gum, and cetyl alcohol according to the formula amount were slowly added under stirring, then homogenized or ultrasonically dissolved to obtain a pre-foaming mixture. A pressurized container was filled with the prepared pre-foaming mixture, followed by with tetrafluoroethane, so as to obtain the foam.

Comparative Example 2

Minoxidil Water-Alcohol Foam (1) Formula

| Component | Content (on a basis of the total mass or total volume of the composition) |
|---|---|
| Minoxidil | 2% (w/v) |
| Sodium dodecyl sulfate | 2 wt % |
| Tween 80 | 1 wt % |
| Glycerol | 4 wt % |
| Polyvinylpyrrolidone | 2 wt % |
| Xanthan gum | 1 wt % |
| Cetyl alcohol | 1 wt % |

-continued

| Component | Content (on a basis of the total mass or total volume of the composition) |
|---|---|
| Propylene glycol | 8 wt % |
| PEG 400 | 25 wt % |
| Tetrafluoroethane | 10 wt % |
| Purified water | Balance |

(2) Preparation Method

Purified water, PEG 400, and propylene glycol according to the formula amount were added into a formulation container, and stirred homogeneously to form a mixed solvent. Tween 80, sodium dodecyl sulfate, minoxidil, glycerol, polyvinylpyrrolidone, xanthan gum, and cetyl alcohol according to the formula amount were slowly added under stirring, and then homogenized or ultrasonically dissolved to obtain a pre-foaming mixture. A pressurized container was filled with the prepared pre-foaming mixture, followed by tetrafluoroethane, to obtain the foam.

Comparative Example 3

Tofacitinib Emulsion Foam (1) Formula

| Component | Content (on a basis of the total mass of the composition) |
|---|---|
| Tofacitinib | 1.5 wt % |
| Soybean oil | 4 wt % |
| Coconut oil | 3 wt % |
| Isopropyl myristate | 3 wt % |
| Cetyl alcohol | 1 wt % |
| Stearyl alcohol | 2 wt % |
| Xanthan gum | 1 wt % |
| Polyvinylpyrrolidone | 1 wt % |
| Sodium dodecyl sulfate | 2 wt % |
| Tween 80 | 2 wt % |
| Glycerol | 4 wt % |
| PEG 400 | 30 wt % |
| Tetrafluoroethane-heptafluoropropane | 10 wt % |
| Purified water | Balance |

(2) Preparation Method

Preparation of an aqueous phase mixture: xanthan gum, polyvinylpyrrolidone, sodium dodecyl sulfate, Tween 80, glycerol, and the like according to the formula amount were added into a mixed solvent of water and polyethylene glycol 400 under stirring, and the mixture was heated to 50-70° C. for dissolution.

Preparation of an oil phase mixture: soybean oil, coconut oil, and isopropyl myristate were heated to a same temperature as that of the aqueous phase, cetyl alcohol, stearyl alcohol, and tofacitinib according to the formula amount were added under stirring for dissolution.

Mixing: the hot oil phase was slowly poured into a hot aqueous phase under stirring, which was emulsified by using a homogenizer and cooled to a room temperature so as to obtain a pre-foaming mixture.

Filling: A pressurized container was filled with the prepared pre-foaming mixture, followed by with a tetrafluoroethane-heptafluoropropane mixture, so as to obtain the foam.

Comparative Example 4

Minoxidil Emulsion Foam (1) Formula

| Component | Content (on a basis of a total mass or total volume of composition) |
|---|---|
| Minoxidil | 2% (w/v) |
| Soybean oil | 4 wt % |
| Coconut oil | 3 wt % |
| Isopropyl myristate | 3 wt % |
| Cetyl alcohol | 1 wt % |
| Stearyl alcohol | 2 wt % |
| Xanthan gum | 1 wt % |
| Polyvinylpyrrolidone | 1 wt % |
| Sodium dodecyl sulfate | 2 wt % |
| Tween 80 | 2 wt % |
| Glycerol | 4 wt % |
| PEG 400 | 30 wt % |
| Tetrafluoroethane-heptafluoropropane | 10 wt % |
| Purified water | Balance |

(2) Preparation Method

Preparation of an aqueous phase mixture: xanthan gum, polyvinylpyrrolidone, sodium dodecyl sulfate, Tween 80, glycerol, and the like according to the formula amount were added into a mixed solvent of water and polyethylene glycol 400 under stirring, and the mixture was heated to 50-70° C. for dissolution.

Preparation of an oil phase mixture: soybean oil, coconut oil, and isopropyl myristate were heated to a same temperature as that of the aqueous phase, cetyl alcohol, stearyl alcohol, and minoxidil according to the formula amount were added under stirring for dissolution.

Mixing: the hot oil phase was slowly poured into a hot aqueous phase under stirring, which was emulsified by using a homogenizer and cooled to a room temperature to obtain a pre-foaming mixture.

Filling: A pressurized container was filled with the prepared pre-foaming mixture, followed by with a tetrafluoroethane-heptafluoropropane mixture, so as to obtain the foam.

Example 5

The following experiments were performed to demonstrate the beneficial effects of the present disclosure.

1. Evaluation of Transdermal Effect

According to the formulas and preparation processes of Examples 1-4, pre-foaming liquids before filling and foams after filling and pressing in these 4 examples were prepared, respectively, and each was subjected to a comparative experiment for transdermal absorption with minoxidil liniment (Dafeixin, Shanxi Ante Bio-pharmaceutical Co., Ltd.) and minoxidil foam (Rogaine, Johnson & Johnson) which have been marketed. Retentivity, Steady-state transdermal rate, Cumulative penetration amount in 24 h, and residual amount of drug in the skin for each of the preparations were evaluated by using the isolated skin from miniature pigs. Specific data is as follows:

Preparation form Evaluation index

| | Example 1 | | Example 2 | | Example 3 | | Example 4 | | Minoxidil liniment (2%) | Minoxidil foam (2%) |
|---|---|---|---|---|---|---|---|---|---|---|
| | Liquid before pressing | Foam after pressing | Liquid before pressing | Foam after pressing | Liquid before pressing | Foam after pressing | Liquid before pressing | Foam after pressing | | |
| Retentivity | 2 | 3 | 2 | 3 | 2 | 3 | 2 | 3 | 1 | 3 |
| Steady-state transdermal rate ($\mu g \cdot cm^{-3} h^{-1}$) | 0.0162 ± 0.0085 | 0.2584 ± 0.0236 | 0.019 ± 0.0487 | 0.2794 ± 0.1005 | 0.0074 ± 0.0258 | 0.1687 ± 0.1675 | 0.0071 ± 0.0093 | 0.1480 ± 0.0201 | 0.0147 ± 0.0105 | 0.2013 ± 0.1226 |
| Cumulative penetration amount in 24 h ($\mu g$) | 1.5282 ± 0.4870 | 15.5728 ± 3.56 | 1.3682 ± 0.9833 | 14.95 ± 2.89 | 4.0762 ± 0.4009 | 19.74 ± 5.56 | 3.0952 ± 0.4628 | 17.98 ± 8.04 | 1.4368 ± 0.7083 | 14.49 ± 6.03 |
| Residual amount of drug in the skin ($\mu g \cdot g^{-1}$) | 10.27 ± 1.44 | 41.73 ± 8.89 | 10.65 ± 2.58 | 46.76 ± 8.47 | 22.37 ± 1.98 | 60.34 ± 10.97 | 19.23 ± 1.73 | 59.25 ± 7.31 | 8.20 ± 0.91 | 39.46 ± 12.36 |

Note:
(1) the steady-state transdermal rate, the cumulative penetration amount in 24 h, and the residual amount of drug in the skin were all calculated by minoxidil; and
(2) evaluation index for retentivity: the retentivity was graded in ascending order (fluidity was graded in descending order) into 1, 2, and 3.

Conclusion: compared with the pre-foaming liquid, after the foam is prepared, the retentivity of the preparation is significantly increased, and the steady-state transdermal rate, the cumulative penetration amount in 24 h, and the residual amount of drug in the skin are all significantly increased. After the active ingredients are prepared into an emulsion, the retentivity has no significant change, and the steady-state transdermal rate is reduced, while the cumulative penetration amount in 24 h and the residual amount of drug in the skin are significantly increased. The transdermal absorption effect: emulsion foam>water-alcohol foam>liniment.

2. Evaluation of Therapeutic Effect on Alopecia Areata

Compound external water-alcohol and emulsion foams with tofacitinib and minoxidil as active ingredients were prepared according to Examples 1 and 3, respectively, and their therapeutic effects were evaluated by animal experiments.

(1) Animal

Alopecia areata mouse model: C57BL/6 mice at 6-8 weeks of age (half female and half male) were lightly anesthetized with diethyl ether, and rosin and paraffin (1:1) were heated and melted, applied to back of the mice, then removed after solidification and hardening. After 8-9 days, production of hair follicles in the anagen was induced on the skin of the back of the mice, and cyclophosphamide was injected intraperitoneally at a single dose of 150 mg/kg. After 4-5 days, the hair on the back of the mice began to fall out, and the alopecia areata model was established.

(2) The Subject Animals were Grouped According to the Type of Drug Administered:
① Normal group (no administration)
② Alopecia areata model group (no administration)
③ Blank water-alcohol foam group (without tofacitinib and minoxidil, rest components and preparation method were the same as those in Example 1)
④ Blank emulsion foam group (without tofacitinib and minoxidil, the rest components and preparation method were the same as those in Example 3)
⑤ Tofacitinib water-alcohol foam group (Comparative Example 1)
⑥ Minoxidil water-alcohol foam group (Comparative Example 2)
⑦ Tofacitinib emulsion foam group (Comparative Example 3)
⑧ Minoxidil emulsion foam group (Comparative Example 4)
⑨ Tofacitinib+minoxidil compound water-alcohol foam group (Example 1)
⑩ Tofacitinib+minoxidil compound emulsion foam group (Example 3)

Note: normal mice were depilated before administration to induce the hair to be in the anagen; and mice in the normal group and the alopecia areata model group were subjected to no administration, while alopecia areata mice in the rest groups were all subjected to the administration.

(3) Administration Regimen

Administration dose: 1 ml/time; 2 times/day; administration for 20 consecutive days; and administration mode: applied to the skin with alopecia areata on the back of the mice.

(4) Evaluation on Alopecia Areata Treatment in each Group of Mice According to Following Criteria Before the administration, a patch of skin with alopecia areata with an area of about 6 $cm^2$ on the back of each mouse was selected as an experimental region. After the administration, hair growth of the mice was observed daily, 5 hairs were randomly plucked from each mouse and measured for a length using a vernier caliper, and a mean value was taken. After 20 days, the experimental region of 6 $cm^2$ was removed together with the skin, and the hair on the patch of skin was carefully plucked clean with tweezers and weighed. Then, the skin tissue of the experimental region was fixed in 10% formaldehyde, and 4 pieces of tissue were consecutively taken along a longitudinal section of the hair follicles, with each tissue being 1.5 cm long. The pieces of tissue were subjected to routine tissue dehydration, paraffin embedding, and HE staining, and examined by optical microscopy, and indexes of the skin tissue of the mice related to the hair growth were observed, specifically including:
① diameter of vessels in superficial dermis ($\mu m$): diameters of 5 random transected capillaries were measured, and a mean value was calculated;

② number of vessels in superficial dermis (number): 5 fields of view at 200× magnification were selected for counting, and a mean value was calculated; and ③ number of regenerated hair follicles in superficial dermis (number): 5 fields of view at 100× magnification were selected for counting, and a mean value was calculated.

A mean value of each group was statistically processed by t-test, *P<0.05, **P<0.01, vs. mice in the alopecia areata model group. Results are as follows:

TABLE 1

Effect of administration groups on mouse hair growth

| Group | n | Hair length (mm) 4 d | 8 d | 12 d | 16 d | 20 d |
|---|---|---|---|---|---|---|
| Normal group | 10 | 3.78 ± 0.54* | 5.17 ± 0.65** | 9.23 ± 1.23** | 11.25 ± 0.76** | 14.39 ± 1.14** |
| Alopecia areata model group | 10 | 3.11 ± 0.33 | 4.27 ± 0.55 | 5.89 ± 0.63 | 7.99 ± 0.41 | 9.52 ± 0.78 |
| Blank water-alcohol foam group | 10 | 3.25 ± 0.62 | 4.45 ± 0.91 | 5.82 ± 1.01 | 8.06 ± 0.95 | 9.85 ± 1.65 |
| Blank emulsion foam group | 10 | 3.14 ± 0.75 | 4.59 ± 0.97 | 6.02 ± 0.72 | 8.03 ± 1.34 | 10.01 ± 1.33 |
| Tofacitinib water-alcohol foam group | 10 | 3.28 ± 0.87 | 5.35 ± 0.30** | 8.22 ± 0.64** | 10.97 ± 0.47** | 12.58 ± 0.83** |
| Minoxidil water-alcohol foam group | 10 | 3.09 ± 0.61 | 5.12 ± 0.49** | 7.85 ± 0.44** | 9.86 ± 1.02** | 11.92 ± 1.36** |
| Tofacitinib + minoxidil compound water-alcohol foam group | 10 | 3.55 ± 0.66 | 5.56 ± 0.28** | 8.84 ± 0.30** | 11.45 ± 0.44** | 14.41 ± 1.57** |
| Tofacitinib emulsion foam group | 10 | 3.45 ± 0.62 | 5.35 ± 0.34** | 8.47 ± 0.63** | 11.12 ± 0.89** | 13.02 ± 1.64** |
| Minoxidil emulsion foam group | 10 | 3.23 ± 0.82 | 5.24 ± 0.67** | 8.06 ± 0.56*8 | 10.15 ± 1.36** | 12.78 ± 0.93** |
| Tofacitinib + minoxidil compound emulsion foam group | 10 | 3.77 ± 0.38* | 5.89 ± 0.83** | 9.65 ± 0.23** | 12.37 ± 1.34** | 15.13 ± 1.43** |

TABLE 2

Effect of administration groups on capillary vessels and hair follicles in the skin of mice

| Group | n | Number of hair follicles (number) | Number of capillary vessels (number) | Diameter of capillary vessels (μm) |
|---|---|---|---|---|
| Normal group | 10 | 8.18 ± 0.54* | 7.47 ± 0.65* | 7.23 ± 1.23** |
| Alopecia areata model group | 10 | 7.51 ± 0.33 | 6.57 ± 0.55 | 6.19 ± 0.63 |
| Blank water-alcohol foam group | 10 | 7.45 ± 0.62 | 6.61 ± 0.91 | 6.22 ± 1.01 |
| Blank emulsion foam group | 10 | 7.55 ± 0.75 | 6.59 ± 0.97 | 6.26 ± 0.72 |
| Tofacitinib water-alcohol foam group | 10 | 8.12 ± 0.87** | 7.35 ± 0.30** | 7.32 ± 0.64** |
| Minoxidil water-alcohol foam group | 10 | 7.99 ± 0.61* | 7.12 ± 0.49** | 6.95 ± 0.44** |
| Tofacitinib + minoxidil water-alcohol compound foam group | 10 | 8.85 ± 0.66** | 7.76 ± 0.28** | 8.04 ± 0.30** |
| Tofacitinib emulsion foam group | 10 | 8.25 ± 0.62** | 7.50 ± 0.34** | 7.47 ± 0.63** |
| Minoxidil emulsion foam group | 10 | 8.17 ± 0.82** | 7.24 ± 0.67** | 7.06 ± 0.56** |
| Tofacitinib + minoxidil compound emulsion foam group | 10 | 9.27 ± 0.38** | 7.92 ± 0.83** | 8.25 ± 0.23** |

Analysis of the results: as can be seen from the results in Tables 1 and 2, groups jointly administrated with tofacitinib and minoxidil had higher hair growth rates than the administration groups of either tofacitinib or minoxidil alone, and the number of hair follicles and capillary vessels, and the diameter of capillary vessels could be significantly increased, indicating that tofacitinib and minoxidil can exert synergistic effect; and the tofacitinib+minoxidil compound foams were significantly effective in treating alopecia areata of the mice, and surprisingly, the compound emulsion foam group had better efficacy than the water-alcohol foam group.

In the present disclosure, tofacitinib and minoxidil acting on different targets are prepared into a compound preparation to exert the synergistic effect. When tofacitinib and minoxidil are prepared into an external preparation, duration of action of a steady-state concentration of drugs can be prolonged. In the present disclosure, the compound external preparation is prepared into a foam that is light in texture and easy to distribute on the scalp, so that the applicability to hair sites and the compliance of patients can be increased. By further improving the foam into an emulsion foam, the solubility and the permeability of the drug can be increased, the toxic and side effects of tofacitinib and minoxidil can be reduced, and duration of the drug effect can be prolonged, so that an important new treatment option is provided for patients with alopecia areata.

Examples 6-17

Solvent Screening for Compound Preparations

Ratios in parts by weight of solvents to be screened to minoxidil and to tofacitinib were each set to be 100:1, which were stirred for 30 min at the room temperature (25° C.) and under a heating condition (60° C.) respectively, and after samples under the heating condition was cooled to the room temperature, dissolution conditions of the active ingredients were detected. Results are shown in Table 3. Dissolution condition and dissolution required for quantifying the API in a quantitive solvent were used as preliminary evaluation indexes, and a solvent capable of dissolving both active ingredients is preferred.

Icon meaning: x: insoluble (this system is a white opaque suspension with visible white solid particles); ○: incompletely soluble (this system is partially transparent, with white visible bulk solids or suspended solids); ✓ completely soluble (the system is a completely transparent solution, without suspended substances and solid insoluble substances); and /: not investigated.

TABLE 3

Summary of solvent screening results for compound preparations

| Example | Solvent type (100 parts by weight in total) | Minoxidil (1 part by weight) | | Tofacitinib citrate (calculated by tofacitinib: 1 part by weight) | |
|---|---|---|---|---|---|
| | | Room temperature (25° C.) | Heating (60° C.) | Room temperature (25° C.) | Heating (60° C.) |
| 6 | Soybean oil | x | x | x | x |
| 7 | Medium chain triglyceride | x | x | x | x |
| 8 | Cetyl alcohol | / | x | / | x |
| 9 | Stearic acid | / | ✓ | / | x |
| 10 | Polyethylene glycol 400 | x | x | x | x |
| 11 | Propylene glycol | ✓ | ✓ | x | x |
| 12 | Glycerol | x | ○ | x | x |
| 13 | Diethylene glycol monoethyl ether | x | ✓ | x | x |
| 14 | Ethanol | x | ○ | x | x |
| 15 | Water | x | x | x | ○ |
| 16-a | Propylene glycol:water = 1:11 (w/w) | ○ | ○ | x | ○ |
| 16-b | Propylene glycol:water = 1:9 (w/w) | ○ | ✓ | x | ✓ |
| 16-c | Propylene glycol:water = 3:7 (w/w) | ✓ | ✓ | ○ | ✓ |
| 16-d | Propylene glycol:water = 5:5 (w/w) | ✓ | ✓ | ○ | ✓ |
| 16-e | Propylene glycol:water = 7:3 (w/w) | ✓ | ✓ | ○ | ✓ |
| 16-f | Propylene glycol:water = 9:1 (w/w) | ✓ | ✓ | x | ✓ |
| 16-g | Propylene glycol:water = 11:1 (w/w) | ✓ | ✓ | x | ○ |
| 17 | Propylene glycol:water:ethanol = 5:2:3 (w/w) | ✓ | ✓ | ○ | ✓ |

Analysis of results: as can be seen from the results in Table 3, for a single solvent investigated, minoxidil had poor solubility in water, soybean oil, medium chain triglyceride, cetyl alcohol, or polyethylene glycol 400, and tofacitinib citrate had poor solubility in either propylene glycol or other single solvents. The applicant surprisingly found that when water and an alcohol solvent (such as propylene glycol or ethanol) were combined, with a weight ratio of the water to the alcohol being 1:9-9:1, more preferably 3:7-7:3, the solubility of the tofacitinib citrate could be significantly improved, while the good solubility of minoxidil was ensured, and no drug was precipitated when cooled to the room temperature (Examples 16-b to 16-g and Example 17).

Examples 18-38

Investigation of Solubilization and Stabilization Effects of Minoxidil on Tofacitinib (1) Different proportions of tofacitinib were set, a mixture of water and an organic solvent was used as a mixed solvent, and a single gel and a compound gel, and a single liniment and a compound liniment were prepared for comparatively investigating dissolved states of tofacitinib in the preparations with and without addition of minoxidil. The samples were stored at the room temperature for 1 month after the preparations were prepared, and stability of tofacitinib was evaluated by whether crystallization occurred or not during the storage. Specific implementation formulas are shown in Tables 4 and 5.

(2) For an unstable preparation which is easy to precipitate tofacitinib crystals during the storage, adjustments were made by adding an organic solvent component, a surfactant, a crystallization inhibitor, or a thickening agent, increasing an amount of minoxidil, for comparatively investigating improvement of the stability of tofacitinib in the preparations with the above methods. Specific implementation formulas are shown in Table 6.

Icon Meaning:

Solubility: (○: incompletely soluble; √: completely soluble); and stability: (x: crystallization and precipitation; √: non-crystallization)

(1) Gel

TABLE 4

Comparison of solubility and stability of tofacitinib in gels with and without addition of minoxidil

| Component | \multicolumn{9}{c}{Examples 18-26 (parts by weight)} |
|---|---|---|---|---|---|---|---|---|---|
|  | 18 | 19 | 20 | 21 | 22 | 23 | 24 | 25 | 26 |
| Minoxidil | 0 | 0 | 2.0 | 2.0 | 2.0 | 2.0 | 2.0 | 2.0 | 2.0 |
| Tofacitinib citrate (calculated by tofacitinib) | 0.5 | 1.0 | 0.1 | 0.5 | 1.0 | 1.5 | 2.0 | 1.0 | 1.0 |
| Sodium carboxymethylcellulose | 2.0 | 2.0 | 2.0 | 2.0 | 2.0 | 2.0 | 2.0 | 2.0 | 2.0 |
| Propylene glycol | 87.8 | 87.3 | 86.3 | 86.0 | 85.5 | 85.0 | 84.6 | 87.1 | 7.9 |
| Water | 9.7 | 9.7 | 9.6 | 9.5 | 9.5 | 9.5 | 9.4 | 7.9 | 87.1 |
| Solubility | √ | ○ | √ | √ | √ | √ | √ | ○ | ○ |
| Stability | √ | X | √ | √ | √ | √ | √ | X | X |

Preparation Method:

Single preparation: a mixed solvent of water and propylene glycol was heated at 70° C., and tofacitinib citrate was added and dissolved to obtain a drug solution; and the temperature was adjusted to 55° C., sodium carboxymethylcellulose was slowly added into the drug solution, which was stirred homogeneously and cooled to the room temperature so as to obtain the gel.

Compound preparation: a mixed solvent of water and propylene glycol was heated at 70° C., minoxidil was added and dissolved, and tofacitinib citrate was then added and dissolved to obtain a drug solution; and the temperature was adjusted to 55° C., sodium carboxymethylcellulose was slowly added into the drug solution, which was stirred homogeneously and cooled to the room temperature so as to obtain the gel.

Analysis of Results:

(a) As can be seen from Examples 18 and 19 in Table 4, an amount of single tofacitinib dissolved in the mixed solvent of water and propylene glycol was limited; and as can be seen from Comparative Examples 19 and 22-24 in Table 4, after a certain amount of minoxidil was added, tofacitinib, which could have not been completely dissolved, could continue to dissolve, indicating that minoxidil can increase the solubility of tofacitinib. As can be seen from the above examples, minoxidil could at least dissolve tofacitinib (calculated by the prototype) in an amount of about 0.05-1.0 times the amount of minoxidil in water and an organic solvent, and keep the stability of the gel.

(b) As can be seen from Table 4, when the weight ratio of water to alcohol was 1:9-9:1, minoxidil could increase the solubility of tofacitinib, but when the weight ratio of water to alcohol was outside this range, the solubility of tofacitinib was not significantly increased by minoxidil.

(2) Liniment

TABLE 5

Comparison of solubility and stability of tofacitinib in liniments with and without addition of minoxidil

| Component | \multicolumn{7}{c}{Examples 27-33 (parts by weight)} |
|---|---|---|---|---|---|---|---|
|  | 27 | 28 | 29 | 30 | 31 | 32 | 33 |
| Minoxidil | 0 | 0 | 0 | 2.0 | 2.0 | 2.0 | 2.0 |
| Tofacitinib citrate (calculated by tofacitinib) | 0.1 | 0.5 | 1.0 | 0.5 | 1.0 | 1.5 | 2.0 |

TABLE 5-continued

Comparison of solubility and stability of tofacitinib in liniments with and without addition of minoxidil

| Component | \multicolumn{7}{c}{Examples 27-33 (parts by weight)} |
|---|---|---|---|---|---|---|---|
|  | 27 | 28 | 29 | 30 | 31 | 32 | 33 |
| Propylene glycol | 50.0 | 49.8 | 49.5 | 48.8 | 48.5 | 48.2 | 48.0 |
| Ethanol | 30.0 | 29.8 | 29.7 | 29.2 | 29.1 | 29.0 | 28.8 |
| Water | 19.9 | 19.9 | 19.8 | 19.5 | 19.4 | 19.3 | 19.2 |
| Solubility | √ | √ | √ | √ | √ | √ | √ |
| Stability | √ | x | x | √ | √ | √ | x |

Preparation Method:

Single preparation: a mixed solvent of water, propylene glycol, and ethanol was heated at 55-60° C., and tofacitinib citrate was added and dissolved to obtain a drug liniment, which was cooled to the room temperature to obtain the liniment.

Compound preparation: a mixed solvent of water and propylene glycol was heated at 70° C., and minoxidil was added and dissolved; and the temperature was adjusted to 55° C., ethanol was added, and tofacitinib citrate was added and dissolved to obtain a drug solution, which was cooled to room temperature so as to obtain the liniment.

Analysis of results: As can be seen from Examples 27-29, when water, ethanol, and propylene glycol were selected as solvents, the stability of the single tofacitinib citrate in the preparations is limited; and as can be seen from Comparative Examples 28 and 30 and Examples 29 and 31-33, a certain amount of minoxidil could increase the stability of tofacitinib citrate in the liniments.

TABLE 6

Comparison of improvement of stability of tofacitinib in liniments by adding minoxidil and other excipients

| Component | | Examples 34-40 (parts by weight) | | | | | | |
|---|---|---|---|---|---|---|---|---|
| | | 34 | 35 | 36 | 37 | 38 | 39 | 40 |
| Minoxidil | | 2.0 | 2.0 | 2.0 | 2.0 | 2.0 | 2.0 | 5.0 |
| Tofacitinib citrate (calculated by tofacitinib) | | 2.0 | 2.0 | 2.0 | 2.0 | 2.0 | 2.0 | 2.0 |
| Propylene glycol | | 38.0 | 47.0 | 47.0 | 47.7 | 47.7 | 46.0 | 46.5 |
| Ethanol | | 22.8 | 28.2 | 28.2 | 28.7 | 28.7 | 27.6 | 27.9 |
| Water | | 15.2 | 18.8 | 18.8 | 19.1 | 19.1 | 18.4 | 18.6 |
| Other excipients | Polyethylene glycol 400 | 20.0 | 0 | 0 | 0 | 0 | 0 | 0 |
| | Sodium dodecyl sulfate | 0 | 2.0 | 0 | 0 | 0 | 0 | 0 |
| | Tween 60 | 0 | 0 | 2.0 | 0 | 0 | 0 | 0 |
| | Sodium carboxy-methylcellulose | 0 | 0 | 0 | 0.5 | 0 | 0 | 0 |
| | Hydroxypropyl methylcellulose | 0 | 0 | 0 | 0 | 0.5 | 0 | 0 |
| | Povidone K30 | 0 | 0 | 0 | 0 | 0 | 4.0 | 0 |

TABLE 6-continued

Comparison of improvement of stability of tofacitinib in liniments by adding minoxidil and other excipients

| Component | Examples 34-40 (parts by weight) | | | | | | |
|---|---|---|---|---|---|---|---|
| | 34 | 35 | 36 | 37 | 38 | 39 | 40 |
| Solubility | √ | √ | √ | √ | √ | √ | √ |
| Stability | × | × | × | × | × | × | √ |

Preparation method: a mixed solvent of water and propylene glycol was heated at 70° C., and minoxidil was added and dissolved; the temperature was adjusted to 55° C., ethanol was added, and tofacitinib citrate was added and dissolved to obtain a drug solution, which was cooled to room temperature; and other excipients were added and dissolved, which was stirred homogeneously so as to obtain the liniment.

Analysis of results: in Example 33, tofacitinib citrate had poor stability in the preparation and was prone to crystallization when water, ethanol, and propylene glycol were selected as solvents; on this basis, adjustments were made by the methods as shown in Examples 34-40, and it can be seen from the comparison that the crystallization of tofacitinib citrate could not be effectively improved by adding an organic solvent component, a surfactant, a thickening agent, a crystallization inhibitor or the like, but when a weight ratio of tofacitinib citrate (calculated by tofacitinib) to minoxidil was ≤3:4, the crystallization of tofacitinib citrate could be effectively improved, indicating that a certain amount of minoxidil can improve the dissolution stability of tofacitinib in the preparations.

Examples 41-50

Investigation of Preparation Methods for Compound Preparations (1) Order of Process At a same heating temperature, differences in the dissolved state and the dissolution time of the drugs, when minoxidil or tofacitinib citrate was first added into the mixed with a solvent, were investigated.

TABLE 7

Results of comparative investigation for order of addition of drugs in compound preparations

| Example | Formula | Order of addition | Heating temperature | Dissolution | Dissolution time (min) | Total dissolution time (min) |
|---|---|---|---|---|---|---|
| 41 | Same as the formula of Example 21 | Former: tofacitinib citrate Latter: Minoxidil | 70° C. | Tofacitinib is dissolved slowly and minoxidil is dissolved quickly | About 20 ≤10 | 20~30 |
| 42 | | Former: Minoxidil Latter: tofacitinib citrate | | Both are dissolved quickly | ≤10 ≤10 | ≤20 |
| 43 | Same as the formula of Example 22 | Former: tofacitinib citrate Latter: Minoxidil | | Tofacitinib is not completely dissolved and has suspended particles, and is dissolved quickly after minoxidil is added | >30 About 15 | >45 |

TABLE 7-continued

Results of comparative investigation for order of addition of drugs in compound preparations

| Example | Formula | Order of addition | Heating temperature | Dissolution | Dissolution time (min) | Total dissolution time (min) |
|---------|---------|-------------------|---------------------|-------------|-----------------------|------------------------------|
| 44 | | Former: Minoxidil Latter: tofacitinib citrate | | Both are dissolved quickly, and tofacitinib is completely dissolved | ≤10 ≤10 | ≤20 |

The results show that minoxidil could promote the tofacitinib citrate to be completely dissolved to a certain extent, and the addition of minoxidil in advance could increase the dissolution rate of tofacitinib citrate, so that the processing time was shortened.

(2) Heating Temperature (1) Examples 45-47: Without Ethanol

TABLE 8

Results of comparative investigation for heating temperature of compound preparations without ethanol

| Example | Formula | Dissolution temperature (° C.) | Dissolution time (min) | Total impurities of related substances (%) |
|---------|---------|-------------------------------|------------------------|--------------------------------------------|
| 45 | Same as the | 50 | >60 | <1.5 |
| 46 | formula of | 60 | >30 | <1.5 |
| 47 | Example 23 | 70 | ~20 | <1.5 |

The results show that the heating temperature of 50-70° C. had no significant effect on related substances of the preparations, and the higher the temperature was, the faster the drugs were dissolved. Therefore, 70° C. was preferred.

(2) Examples 48-50: with Ethanol (the Heating Temperature Should Not be too High)

a. Formula: same as the formula of Example 24 b. Dissolution mode and process:

Example 48: under a condition of 70° C., minoxidil was added into a mixed solvent of propylene glycol and water and could be dissolved quickly; tofacitinib citrate was added and could not be dissolved completely, then, ethanol was added, which was heated at 55° C., and tofacitinib citrate was completely dissolved.

Example 49: under a condition of 70° C., minoxidil was added into a mixed solvent of propylene glycol and water and could be dissolved quickly; then, the temperature was adjusted to 55° C., ethanol was added, and tofacitinib citrate was added and could be dissolved quickly.

Example 50: under a condition of 55-60° C., minoxidil was added into a mixed solvent of propylene glycol, ethanol, and water and was dissolved slightly slowly; then, tofacitinib citrate was added and could be dissolved quickly.

TABLE 9

Results of comparative investigation for heating temperature of compound preparations with ethanol

| Example | Dissolution time (min) | Total impurities of related substances (%) |
|---------|------------------------|--------------------------------------------|
| 48 | >50 min | <1.5 |
| 49 | About 30 min | <1.5 |
| 50 | >50 min | <1.5 |

Analysis of the results: the results in Table 9 show that the heating temperature of 55-70° C. had no significant effect on related substances of the preparations. The heating temperature should not be too high due to presence of ethanol, and preparation time of the samples could be shortened by dissolving minoxidil in a solvent without ethanol, then lowering the temperature, adding ethanol, and dissolving tofacitinib citrate.

Example 51

Efficacy Evaluation

Referring to the sole FIGURE, the animal efficacy evaluation was performed according to the following scheme:

(1) Experimental Animals:

Alopecia areata mouse model: SPF male C3H/HeN mice with intact hair in terms of appearance were selected, and an imiquimod cream was coated on back of the mice, 3 times a week for consecutive 4 weeks, to form alopecia areata with an area>1 cm×1 cm at the administration part, so that the model was successfully established.

(2) Test Groups and Samples

The mice were randomly divided into a blank control group (10 mice) and a model group (70 mice) according to weight of the mice, and the blank control group was not modeled and the model group was modeled. The model group was then randomly divided into 7 groups, including a blank gel group, a minoxidil 1 group, a minoxidil 2 group, a tofacitinib group, and compound low-dose, medium-dose and high-dose groups according to different administration modes. Specific information is as follows:

TABLE 10

Grouping information on animal test

| Group | Sample | Number of animals (mice) |
|---|---|---|
| Blank control group | — | 10 |
| Blank gel group | Blank matrix (components except for minoxidil and tofacitinib citrate in Example 20) | 10 |
| Minoxidil 1 group | 2% minoxidil liniment (Shanxi Ante Bio-pharmaceutical Co., Ltd.) | 10 |
| Minoxidil 2 group | 5% minoxidil liniment (Shanxi Ante Bio-pharmaceutical Co., Ltd.) | 10 |
| Tofacitinib group | Example 18: 0.5% tofacitinib citrate (calculated by tofacitinib) | 10 |
| Compound low-dose group | Example 20: 0.1%/2.0% (tofacitinib citrate (calculated by tofacitinib)/minoxidil) | 10 |
| Compound medium-dose group | Example 21: 0.5%/2.0% (tofacitinib citrate (calculated by tofacitinib)/minoxidil) | 10 |
| Compound high-dose group | Example 23: 1.5%/2.0% (tofacitinib citrate (calculated by tofacitinib)/minoxidil) | 10 |

(3) Administration Regimen

Administration dose: gel group: 0.05 g/cm$^2$, and liniment group: 0.05 mL/cm$^2$; 2 times/day; administration for 2 consecutive weeks (14 days); and administration mode: applied to the skin with alopecia areata on the back of the mice.

(4) Evaluation on Alopecia Areata Treatment in each Group of Mice according to Following Criteria The hair loss in patches in the region of alopecia areata before the administration and week 1 and week 2 after the administration was observed, measured, and recorded, and scoring was performed according to a proportion of the area of the hairy region in the alopecia areata experimental region by following criteria: score 0: the hairy region≥75%; score 1: 50%≤the hairy region<75%; score 2: 25%≤the hairy region<50%; and score 3: the hairy region<25%. The alopecia areata mice before administration were all enrolled with alopecia totalis (no hair in the experimental region), and thus were scored 3. After 14 days, the animals were euthanized, the experimental regions of part of the animals were removed together with the skin, and the hair on the patches of skin was carefully plucked clean with tweezers. Then, the skin tissue of the experimental regions was fixed in 10% formaldehyde, and 4 pieces of tissue were consecutively taken along the longitudinal section of the hair follicles, with each tissue being 1.5 cm long. The pieces of tissue were subjected to routine tissue dehydration, paraffin embedding, and HE staining, and examined by optical microscopy, and the number of regenerated hair follicles in superficial dermis, the number of mature hair follicles in superficial dermis, and a ratio of regenerated hair follicles to mature hair follicles were observed and recorded.

A mean value of each group was statistically processed with the software SPSS. Results are as follows:

TABLE 11

Results of scoring for hair of each group of mice ($\bar{x} \pm s$, n = 10)

| Group | Content | Day 0 of administration | Week 1 after the administration | Week 2 after the administration |
|---|---|---|---|---|
| Blank control group | — | 0.0 ± 0.0 | 0.0 ± 0.0 | 0.0 ± 0.0 |
| Model control group | — | 3.0 ± 0.0** | 2.7 ± 0.5** | 2.4 ± 0.5**# |
| Minoxidil 1 group | 2% | 3.0 ± 0.0 | 2.5 ± 0.5## | 2.0 ± 0.7## |
| Minoxidil 2 group | 5% | 3.0 ± 0.0 | 2.4 ± 0.5## | 1.9 ± 0.5+## |
| Tofacitinib group | 0.5% | 3.0 ± 0.0 | 2.6 ± 0.5# | 2.0 ± 0.6## |
| Compound low-dose group (formula of Example 20) | 0.1%/2.0% | 3.0 ± 0.0 | 2.2 ± 0.4+## | 1.8 ± 0.6+## |
| Compound medium-dose group (formula of Example | 0.5%/2.0% | 3.0 ± 0.0 | 2.3 ± 0.5+## | 1.8 ± 0.4+## |
| Compound high-dose group (formula of Example 23) | 1.5%/2.0% | 3.0 ± 0.0 | 2.2 ± 0.4+## | 1.7 ± 0.2++##& |

Note:
model control group vs. blank control group, **$P < 0.01$; model administration group vs. model control group, +$P < 0.05$, ++$P < 0.01$; group vs. the same group before the same administration, #$P \le 0.05$, ##$P \le 0.01$; and vs. 2% minoxidil group, &$P < 0.05$.

The results show that compared with the model control group, the compound groups had the highest hair growth rate and showed statistical difference in scores on week 1 after the administration, the minoxidil 1 group (with the same minoxidil specification) did not show the statistical difference even on week 2 after the administration, and the other groups showed the statistical difference on week 2 after the administration. Therefore, the compound groups take effect more quickly than the single groups.

TABLE 12

Effect of compound gel on a ratio of regenerated hair follicles/mature hair follicles at the modeling site of model mice with alopecia areata ($\bar{x} \pm s$)

| Group | Content | Number of regenerated hair follicles (number/field of view) | Number of mature hair follicles (number/field of view) | Ratio of regenerated hair follicles/mature hair follicles |
|---|---|---|---|---|
| Blank control group | — | 7.9 ± 4.1 | 7.3 ± 5.3 | 1.2 ± 0.4 |
| Model control group | — | 5.0 ± 1.7 | 7.4 ± 2.2 | 0.7 ± 0.3* |
| Minoxidil 1 group | 2% | 5.3 ± 2.7 | 5.3 ± 0.8 | 1.0 ± 0.4 |
| Minoxidil 2 group | 5% | 5.6 ± 3.7 | 4.7 ± 3.8 | 1.3 ± 0.5$^+$ |
| Tofacitinib group | 0.5% | 7.9 ± 1.6 | 9.2 ± 3.9 | 0.9 ± 0.6 |
| Compound low-dose group (formula of Example 20) | 0.1%/2% | 12.3 ± 3.3$^{++\&\&}$ | 10.1 ± 4.7 | 1.2 ± 0.4$^+$ |
| Compound medium-dose group (formula of Example 21) | 0.5%/2% | 14.5 ± 7.9$^{++\&\&}$ | 12.5 ± 6.0 | 1.2 ± 0.1$^+$ |
| Compound high-dose group (formula of Example 23) | 1.5%/2% | 9.3 ± 2.6$^{+\&}$ | 5.5 ± 1.5 | 1.7 ± 0.5$^{++\&}$ |

Note:
model control group vs. blank control group, *$P < 0.05$; model administration group vs. model control group, $^+P < 0.05$, $^{++}P < 0.01$; and vs. 2% minoxidil group, $^\&P < 0.05$, $^{\&\&}P < 0.01$.

The results show that compared with the model control group and the minoxidil 1 group (with the same minoxidil specification), the number of regenerated hair follicles of the skin at the modeling site of the mice in the compound groups was significantly increased, and the ratio of regenerated hair follicles/mature hair follicles was increased to a certain extent, indicating that the compound groups can further promote growth of hair follicles.

In summary, the results show that the compound external preparations consisting of tofacitinib citrate and minoxidil according to the technical solutions provided by the patent can exert the synergistic effect, promote the growth of hair follicles, and accelerate the hair regeneration.

Technical features in the above examples may be combined in any combinations. In order to make the description brief, all possible combinations of various technical features in the above examples are not described; however, it should be considered as being within the scope of this specification as long as there is no contradiction in the combinations of the technical features.

The above examples only illustrate several embodiments of the present disclosure for a purpose of specific and detailed description, but should not be construed as limiting the scope of the present disclosure. It should be noted that various changes and modifications can be made by those skilled in the art without departing from the spirit of the present disclosure, and these changes and modifications are all within the protection scope of the present disclosure. Therefore, the protection scope of the present disclosure should be determined with reference to the appended claims.

What is claimed is:

1. A compound external preparation for treating alopecia areata, wherein the compound external preparation comprises an active ingredient A and an active ingredient B, the active ingredient A being a JAK inhibitor tofacitinib citrate, the active ingredient B being minoxidil, and the external preparation is a liniment, a gel, or a foam;
   in the liniment, calculated by JAK inhibitor and minoxidil, the active ingredient A and the active ingredient B are in a weight ratio of no more than 3:4 in the compound external preparation; in the gel, calculated by JAK inhibitor and minoxidil, the active ingredient A and the active ingredient B are in a weight ratio of 0.05:1~1:1 in the compound external preparation; and the compound external preparation further comprises a solvent which is a mixture of water and alcohol in a weight ratio of 9:1-1:9.

2. The compound external preparation according to claim 1, wherein calculated by a JAK inhibitor, the active ingredient A has a percentage of 0.1 wt %-10 wt % or 0.1% (w/v)-10% (w/v) in the compound external preparation; and calculated by minoxidil, the active ingredient B has a percentage of 0.1 wt %-10 wt % or 0.1% (w/v)-10% (w/v) in the compound external preparation.

3. The compound external preparation according to claim 1, wherein the compound external preparation further comprises a pharmaceutically acceptable excipient.

4. The compound external preparation according to claim 1, wherein
   the alcohol comprises at least one selected from ethanol, propylene glycol, glycerol, and polyethylene glycol; and
   the solvent has a content of 5 wt %-99.8 wt % or 5 wt %-80 wt % in the compound external preparation.

5. The compound external preparation according to claim 3, wherein the pharmaceutically acceptable excipient comprises at least one selected from a penetration enhancer, a surfactant, a crystallization inhibitor, a foam adjuvant, a thickening agent, a gel matrix, an antioxidant, and an antibacterial agent;
   a pharmaceutically acceptable excipient in the liniment comprises at least one selected from a penetration enhancer, a surfactant, a crystallization inhibitor, an antioxidant, and an antibacterial agent;
   a pharmaceutically acceptable excipient in the gel comprises at least one selected from a penetration enhancer, a surfactant, a crystallization inhibitor, a gel matrix, an antioxidant, and an antibacterial agent;
   a pharmaceutically acceptable excipient in the foam comprises at least one selected from a thickening agent, a penetration enhancer, a crystallization inhibitor, an antioxidant, a foam adjuvant, and an antibacterial agent;

the penetration enhancer comprises at least one selected from menthol, eucalyptol, oleic acid, isopropyl myristate, ethanol, propylene glycol, sodium dodecyl sulfate, poloxamer, and diethylene glycol monoethyl ether;

the penetration enhancer has a content of 1 wt %-30 wt % or 1% (w/v)-30% (w/v) or 1 wt %-10 wt % or 1% (w/v)-10% (w/v) in the compound external preparation;

the surfactant comprises at least one selected from Tween 80, poloxamer, Span, Brij, sodium dodecyl sulfate, polyethoxylated castor oil, and sodium fatty alcohol polyoxyethylene ether sulfate;

the surfactant has a content of 0.5 wt %-10 wt % in the compound external preparation;

the crystallization inhibitor comprises at least one selected from povidone, sodium dodecyl sulfate, sorbitol, hydroxypropyl methylcellulose, and levulinic acid;

the crystallization inhibitor has a content of 0.1 wt %-10 wt % or 0.1% (w/v)-10% (w/v) in the compound external preparation;

the thickening agent or the gel matrix comprises at least one selected from glycerol, polyvinyl alcohol, polyvinylpyrrolidone, sodium alginate, xanthan gum, sodium carboxymethylcellulose, hydroxypropyl methylcellulose, methylcellulose, and carbomer;

the thickening agent or the gel matrix has a content of 0.5 wt %-10 wt % in the compound external preparation;

the foam adjuvant comprises at least one selected from cetyl alcohol, stearyl alcohol, arachidyl alcohol, stearic acid, arachidic acid, and oleyl alcohol;

the foam adjuvant has a content of 0.5 wt %-10 wt % in the compound external preparation;

the antioxidant comprises at least one selected from sodium sulfite, sodium bisulfite, sodium thiosulfate, sodium metabisulfite, ascorbic acid, ascorbyl palmitate, propyl gallate, tocopherol, butylhydroxyanisole, dibutylhydroxytoluene, and edetate disodium;

the antioxidant has a content of 0.005 wt %-2 wt % or 0.005% (w/v)-2% (w/v) in the compound external preparation;

the antibacterial agent comprises at least one selected from benzoic acid and a sodium salt thereof, propionic acid, sodium lactate, sorbic acid and a potassium salt thereof, paraben, dimethyl fumarate, and sodium dehydroacetate;

the antibacterial agent has a content of 0.01 wt %-5 wt % or 0.01% (w/v)-5% (w/v) in the compound external preparation;

the foam further comprises a propellant;

the propellant is hydrocarbon gas or a hydrofluoroalkane liquefied gas with a boiling point lower than a room temperature at a normal pressure;

the hydrocarbon gas comprises at least one selected from propane, butane, isobutane, and a mixture thereof;

the hydrofluoroalkane liquefied gas comprises at least one selected from tetrafluoroethane, heptafluoropropane, dimethyl ether, and a mixture thereof; and the propellant has a content of 2 wt %-25 wt % in the compound external preparation.

6. The compound external preparation according to claim 1, wherein the foam comprises an oil-in-water, water-in-oil, or multiple emulsion consisting of an active ingredient A, an active ingredient B, an aqueous medium, an oily medium, and a pharmaceutically acceptable excipient;

the aqueous medium comprises at least one selected from water, ethanol, propylene glycol, glycerol, and polyethylene glycol;

the aqueous medium has a total content of 5 wt %-80 wt % in the compound external preparation;

the oily medium comprises at least one selected from silicone oil, mineral oil, vegetable oil, and polyunsaturated fatty acid;

the oily medium has a total content of 5 wt %-80 wt % in the compound external preparation;

the silicone oil comprises at least one selected from dimethicone and cyclomethicone;

the mineral oil comprises at least one selected from liquid paraffin and vaseline;

the vegetable oil comprises at least one selected from coconut oil, soybean oil, and isopropyl myristate; and the polyunsaturated fatty acid comprises at least one selected from linoleic acid and linolenic acid.

7. The compound external preparation according to claim 1, wherein the liniment comprises the active ingredient A, the active ingredient B, a solvent, and optionally a pharmaceutically acceptable excipient; calculated by a JAK inhibitor, the active ingredient A has a percentage of 0.1 wt %-10 wt % in the compound external preparation; calculated by minoxidil, the active ingredient B has a mass percentage of 0.1% (w/v)-10% (w/v) in the compound external preparation; the solvent is a mixture of water and alcohol; the alcohol comprises at least one selected from ethanol, propylene glycol, glycerol, and polyethylene glycol; the solvent has a content of 50 wt %-99.8 wt % in the liniment; and the pharmaceutically acceptable excipient has a content of 0-20 wt % in the liniment;

the liniment comprises the active ingredient A, the active ingredient B, a solvent, and optionally a pharmaceutically acceptable excipient; calculated by a JAK inhibitor, the active ingredient A has a percentage of 0.1 wt %-5.0 wt % in the compound external preparation; calculated by minoxidil, the active ingredient B has a mass percentage of 1.0% (w/v)-5.0% (w/v) in the compound external preparation; the solvent is a mixture of water and alcohol; the alcohol comprises at least one selected from ethanol, propylene glycol, glycerol, and polyethylene glycol; the solvent has a content of 50 wt %-99.8 wt % in the liniment; and the pharmaceutically acceptable excipient has a content of 0-20 wt % in the liniment;

the liniment comprises the active ingredient A, the active ingredient B, a solvent, and optionally a pharmaceutically acceptable excipient; calculated by a JAK inhibitor, the active ingredient A has a percentage of 0.1 wt %-2.0 wt % in the compound external preparation; calculated by minoxidil, the active ingredient B has a mass percentage of 2.0% (w/v)-5.0% (w/v) in the compound external preparation; the solvent is a mixture of water and alcohol; the alcohol comprises at least one selected from ethanol, propylene glycol, glycerol, and polyethylene glycol; the solvent has a content of 50 wt %-97.9 wt % in the liniment; and the pharmaceutically acceptable excipient has a content of 0-20 wt % in the liniment;

the gel comprises the active ingredient A, the active ingredient B, a solvent, and a pharmaceutically acceptable excipient; the pharmaceutically acceptable excipient comprises a gel matrix and optionally other excipients, and the other excipients comprise at least one selected from a penetration enhancer, a surfactant, a crystallization inhibitor, an antioxidant, and an antibacterial agent; calculated by a JAK inhibitor, the active ingredient A has a percentage of 0.1 wt %-10 wt % in the compound external preparation; calculated by minoxidil, the active ingredient B has a mass percentage of 0.1% (w/v)-10% (w/v) in the compound external preparation; the solvent is a mixture of water and alcohol; the alcohol comprises at least one selected from ethanol, propylene glycol, glycerol, and polyethylene glycol; the solvent has a content of 50 wt %-99.7 wt % in the compound external preparation; and the gel matrix has a content of 0.1 wt %-30 wt % in the compound external preparation, and the other excipients have a content of 0-20 wt % in the compound external preparation;

the gel comprises the active ingredient A, the active ingredient B, a solvent, and a pharmaceutically acceptable excipient; the pharmaceutically acceptable excipient comprises a gel matrix and optionally other excipients, and the other excipients comprise at least one selected from a penetration enhancer, a surfactant, a crystallization inhibitor, an antioxidant, and an antibacterial agent; calculated by a JAK inhibitor, the active ingredient A has a percentage of 0.1 wt %-5 wt % in the compound external preparation; calculated by minoxidil, the active ingredient B has a mass percentage of 1% (w/v)-5% (w/v) in the compound external preparation; the solvent is a mixture of water and alcohol; the alcohol comprises at least one selected from ethanol, propylene glycol, glycerol, and polyethylene glycol; the solvent has a content of 50 wt %-98.8 wt % in the compound external preparation; and the gel matrix has a content of 0.1 wt %-30 wt % in the compound external preparation, and the other excipients have a content of 0-20 wt % in the compound external preparation;

the gel comprises the active ingredient A, the active ingredient B, a solvent, and a pharmaceutically acceptable excipient; the pharmaceutically acceptable excipient comprises a gel matrix and optionally other excipients, and the other excipients comprise at least one selected from a penetration enhancer, a surfactant, a crystallization inhibitor, an antioxidant, and an antibacterial agent; calculated by a JAK inhibitor, the active ingredient A has a percentage of 0.1 wt %-2 wt % in the compound external preparation; calculated by minoxidil, the active ingredient B has a mass percentage of 2% (w/v)-5% (w/v) in the compound external preparation; the solvent is a mixture of water and alcohol; the alcohol comprises at least one selected from ethanol, propylene glycol, glycerol, and polyethylene glycol; the solvent has a content of 50 wt %-97.8 wt % in the compound external preparation; and the gel matrix has a content of 0.1 wt %-30 wt % in the compound external preparation, and the other excipients have a content of 0-20 wt % in the compound external preparation;

the foam comprises the active ingredient A, the active ingredient B, a solvent, a propellant, and a pharmaceutically acceptable excipient; the pharmaceutically acceptable excipient comprises a thickening agent, a surfactant, and optionally other excipients, and the other excipients comprise at least one selected from a penetration enhancer, a crystallization inhibitor, an antioxidant, a foam adjuvant, and an antibacterial agent; calculated by a JAK inhibitor, the active ingredient A has a percentage of 0.1 wt %-10 wt % in the compound external preparation; calculated by minoxidil, the active ingredient B has a mass percentage of 0.1% (w/v)-10% (w/v) in the compound external preparation; the solvent is a mixture of water and alcohol; the alcohol comprises at least one selected from ethanol, propylene glycol, glycerol, and polyethylene glycol; the solvent has a content of 50 wt %-96.8 wt % in the compound external preparation; and the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation;

the foam comprises the active ingredient A, the active ingredient B, a solvent, a propellant, and a pharmaceutically acceptable excipient; the pharmaceutically acceptable excipient comprises a thickening agent, a surfactant, and optionally other excipients, and the other excipients comprise at least one selected from a penetration enhancer, a crystallization inhibitor, an antioxidant, a foam adjuvant, and an antibacterial agent; calculated by a JAK inhibitor, the active ingredient A has a percentage of 0.1 wt %-5 wt % in the compound external preparation; calculated by minoxidil, the active ingredient B has a mass percentage of 1% (w/v)-5% (w/v) in the compound external preparation; the solvent is a mixture of water and alcohol; the alcohol comprises at least one selected from ethanol, propylene glycol, glycerol, and polyethylene glycol; the solvent has a content of 50 wt %-95.9 wt % in the compound external preparation; and the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation;

the foam comprises the active ingredient A, the active ingredient B, a solvent, a propellant, and a pharmaceutically acceptable excipient; the pharmaceutically acceptable excipient comprises a thickening agent, a surfactant, and optionally other excipients, and the other excipients comprise at least one selected from a penetration enhancer, a crystallization inhibitor, an antioxidant, a foam adjuvant, and an antibacterial agent; calculated by a JAK inhibitor, the active ingredient A has a percentage of 0.1 wt %-2 wt % in the compound external preparation; calculated by minoxidil, the active ingredient B has a mass percentage of 2% (w/v)-5% (w/v) in the compound external preparation; the solvent is a mixture of water and alcohol; the alcohol comprises at least one selected from ethanol, propylene glycol, glycerol, and polyethylene glycol; the solvent has a content of 50 wt %-94.9 wt % in the compound external preparation; and the surfactant has a content of 0.5 wt %-15 wt % in the compound external preparation, the propellant has a content of 2 wt %-10 wt % in the compound external preparation, the thickening agent has a content of 0.5 wt %-10 wt % in the compound external preparation, and the other excipients have a content of 0-20 wt % in the compound external preparation.

8. The compound external preparation according to claim 1, wherein on a basis of a total mass or total volume of the liniment, the liniment comprises 1.5 wt % of tofacitinib citrate calculated by tofacitinib, 5.0% (w/v) of minoxidil, 0.1 wt % dibutylhydroxytoluene, 50.0 wt % of propylene glycol, and 30.0 wt % of ethanol, with balance being water;

on a basis of a total mass or total volume of the liniment, the liniment comprises 0.5 wt % of tofacitinib citrate calculated by tofacitinib, 2.0% (w/v) minoxidil, 0.1 wt % of butylhydroxyanisole, 20.0 wt % of propylene glycol, and 30.0 wt % of ethanol, with balance being water;

on a basis of a total mass or total volume of the gel, the gel comprises 1.5 wt % of tofacitinib citrate calculated by tofacitinib; 5.0% (w/v) of minoxidil, 2.0 wt % of L-menthol, 2.0 wt % of sodium carboxymethylcellulose, and 65.0 wt % of propylene glycol, with balance being water;

on a basis of a total mass or total volume of the gel, the gel comprises 1.5 wt % of tofacitinib citrate calculated by tofacitinib, 2.0% (w/v) of minoxidil, 2.0 wt % sodium carboxymethylcellulose, 50.0 wt % propylene glycol, and 15.0 wt % of ethanol, with balance being water;

on a basis of a total mass or total volume of the foam, the foam comprises 1.5 wt % of tofacitinib citrate calculated by tofacitinib, 2.0% (w/v) of minoxidil, 4.0 wt % of Tween 80, 3.0 wt % of xanthan gum, 3.0 wt % of cetyl alcohol, 20.0 wt % of propylene glycol, 30.0 wt % of ethanol, and 5.0 wt % of hydrofluoroalkane compound or mixture, with balance being water;

on a basis of a total mass or total volume of the foam, the foam comprises 1.5 wt % of tofacitinib citrate calculated by tofacitinib, 5.0% of (w/v) minoxidil, 2.0 wt % of sodium dodecyl sulfate, 4.0 wt % of polyvinyl alcohol, 3.0 wt % of cetyl alcohol, 50.0 wt % of propylene glycol, 10.0 wt % of ethanol, and 5.0 wt % of hydrofluoroalkane compound or mixture, with balance being water;

on a basis of a total mass or total volume of the foam, the foam comprises 0.1 wt %-10 wt % of active ingredient A, 0.1% (w/v)-10% (w/v) of active ingredient B, 5 wt %-80 wt % of water, 5 wt %-80 wt % of polyethylene glycol 400, 5 wt %-25 wt % of hydrofluoroalkane compound or mixture, 0.5 wt %-10 wt % of Tween 80, 0.5 wt %-10 wt % of xanthan gum, 0.5 wt %-10 wt % of glycerol, and 0.5 wt %-10 wt % of cetyl alcohol;

on a basis of a total mass or total volume of the foam, the foam comprises 2 wt % of active ingredient A, 2% (w/v) of active ingredient B, 54 wt % of water, 25 wt % of polyethylene glycol 400, 10 wt % of tetrafluoroethane, 1 wt % of Tween 80, 1 wt % of xanthan gum, 4 wt % of glycerol, and 1 wt % of cetyl alcohol;

on a basis of a total mass or total volume of the foam, the foam comprises 0.1 wt %-10 wt % of active ingredient A, 0.1% (w/v)-10% (w/v) of active ingredient B, 5 wt %-25 wt % of hydrofluoroalkane compound or mixture, 5 wt %-80 wt % of water, 5 wt %-80 wt % of polyethylene glycol 400, 5 wt %-80 wt % of vegetable oil, 0.5 wt %-10 wt % of Tween 80, 0.5 wt %-10 wt % of xanthan gum, 0.5 wt %-10 wt % of glycerol, and 0.5 wt %-10 wt % of cetyl alcohol;

on a basis of a total mass or total volume of the foam, the foam comprises 2 wt % of active ingredient A, 2% (w/v) of active ingredient B, 38 wt % of water, 30 wt % of polyethylene glycol 400, 10 wt % of tetrafluoroethane, 4 wt % of soybean oil, 3 wt % of coconut oil, 3 wt % of isopropyl myristate, 2 wt % of Tween 80, 1 wt % of xanthan gum, 4 wt % of glycerol, and 1 wt % of cetyl alcohol; or on a basis of a total mass or total volume of the foam, the foam comprises 1.5 wt % of active ingredient A, 2% (w/v) of active ingredient B, 41.5 wt % of water, 30 wt % of polyethylene glycol 400, 10 wt % of tetrafluoroethane-heptafluoropropane mixture, 4 wt % of soybean oil, 3 wt % of isopropyl myristate, 2 wt % of Tween 80, 1 wt % of xanthan gum, 4 wt % of glycerol, and 1 wt % of cetyl alcohol.

9. A preparation method for the compound external preparation according to claim 1, wherein the compound external preparation is a foam, and the preparation method for the foam comprises directly dissolving the active ingredient A, the active ingredient B, and a pharmaceutically acceptable excipient in a solvent; or the preparation method for the foam comprises preparing the active ingredient A and the active ingredient B into an emulsion, and wherein optionally, when the active ingredient A and the active ingredient B are dissolved in the solvent, the active ingredient B is firstly added and mixed, and then the active ingredient A is added and dissolved to obtain the foam;

the compound external preparation is a foam, and a preparation method for the foam comprises directly dissolving the active ingredient A, the active ingredient B, and a pharmaceutically acceptable excipient in a solvent, which is directly added into a hand-press net-type foam emulsion generating device so as to form the foam by pressing the device, or which is filled in a pressurized container so as to form the foam by pressing a valve after a propellant is filled, and wherein optionally, when the active ingredient A and the active ingredient B are dissolved in the solvent, the active ingredient B is firstly added and mixed, and then the active ingredient A is added and dissolved to obtain the foam;

the compound external preparation is a foam, and a preparation method for the foam comprises preparing the active component A and the active component B into an emulsion; and directly adding the emulsion into a hand-press net-type foam emulsion generating device and pressing the device to form the foam, or filling a pressurized container with the emulsion, followed by a propellant, and pressing a valve to form the foam;

the compound external preparation is a foam, the foam is a water-alcohol foam, and a preparation method for the water-alcohol foam comprises mixing the active ingredient A, the active ingredient B, a surfactant, a thickening agent, and a foam adjuvant with a solvent, which is homogenized by using a homogenizer or ultrasonically dissolved; and filled into a hand-press net-type foam emulsion pump bottle, or filled into a pressurized container, which is then filled with a propellant, so as to obtain the foam, and wherein optionally, when the active ingredient A and the active ingredient B are dissolved in the solvent, the active ingredient B is firstly added and mixed, and then the active ingredient A is added and dissolved to obtain the foam;

the compound external preparation is a foam, the foam is a water-alcohol foam, and a preparation method for the water-alcohol foam comprises mixing the active ingredient A, the active ingredient B, a surfactant, a thickening agent, and a foam adjuvant with a solvent; which is homogenized by using a homogenizer or ultrasonically dissolved; and filled into a hand-press net-type foam emulsion pump bottle, or filled in a pressurized container, which is then filled with a propellant, so as to obtain the foam, and wherein optionally, when the active ingredient A and the active ingredient B are dissolved in the solvent, the active ingredient B is firstly added and mixed, and then the active ingredient A is added and dissolved to obtain the foam;

the compound external preparation is a foam, the foam is an emulsion foam, and a preparation method for the emulsion foam comprises:
(1) preparation of an aqueous phase mixture: mixing a surfactant and a thickening agent with an aqueous medium, and heating the mixture to 50-70° C. for dissolution;
(2) preparation of an oil phase mixture: dissolving a foam adjuvant, the active ingredient A, and the active ingredient B in an oily medium at 50-70° C.;
(3) mixing: pouring the oil phase mixture into an aqueous phase under stirring, which is emulsified by using a homogenizer, and then cooled to a room temperature so as to obtain a pre-foaming mixture; and
(4) filling: filling a hand-press net-type foam emulsion pump bottle with the prepared pre-foaming mixture, or filling the prepared pre-foaming mixture into a pressurized container, which is then filled with tetrafluoroethane, so as to obtain the foam;
the compound external preparation is a liniment, and a preparation method for the liniment comprises dissolving the active ingredient A, the active ingredient B, and optionally a pharmaceutically acceptable excipient in a solvent, and wherein optionally, when the active ingredient A and the active ingredient B are dissolved in the solvent, the active ingredient B is firstly added and mixed to obtain the liniment;
the compound external preparation is a liniment, and a preparation method for the liniment comprises dissolving an active ingredient B in a mixture of water and alcohol, adding ethanol and an active ingredient A, optionally adding other pharmaceutically acceptable excipients, and dissolving so as to obtain the liniment;
the compound external preparation is a gel, and a preparation method for the gel comprises dissolving an active ingredient B in a mixture of water and alcohol to obtain a drug solution, mixing a suspension containing a gel matrix with the drug solution, and optionally adding and mixing other pharmaceutically acceptable excipients to obtain the compound external preparation; and
the compound external preparation is a gel, and a preparation method for the gel comprises:
heating a mixed solvent of water and alcohol at 70° C., adding and dissolving minoxidil, and adding and dissolving tofacitinib citrate to obtain a drug solution; and adjusting a temperature to 50-60° C., slowly adding a gel matrix into the drug solution, which is homogeneously stirred, and cooled to a room temperature, and adding a penetration enhancer, and stirring so as to obtain the gel.

10. The compound external preparation according to claim 2, wherein the compound external preparation further comprises a pharmaceutically acceptable excipient.

11. The compound external preparation according to claim 1, wherein the compound external preparation further comprises a pharmaceutically acceptable excipient.

12. The compound external preparation according to claim 2, wherein the compound external preparation further comprises a pharmaceutically acceptable excipient.

* * * * *